(12) United States Patent
Jang et al.

(10) Patent No.: US 7,296,278 B2
(45) Date of Patent: Nov. 13, 2007

(54) DISK DRIVE

(75) Inventors: Jae-Won Jang, Gyeonggi-Do (KR); Won-Hyung Cho, Seoul (KR); Ki-Ro Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 10/841,095

(22) Filed: May 6, 2004

(65) Prior Publication Data

US 2004/0228226 A1 Nov. 18, 2004

(30) Foreign Application Priority Data

| May 15, 2003 | (KR) | ............... 10-2003-0031009 |
| May 15, 2003 | (KR) | ............... 10-2003-0031010 |
| Dec. 16, 2003 | (KR) | ............... 10-2003-0092101 |
| Dec. 16, 2003 | (KR) | ............... 10-2003-0092104 |
| Dec. 24, 2003 | (KR) | ............... 10-2003-0096854 |

(51) Int. Cl.
*G11B 17/03* (2006.01)
*G11B 33/02* (2006.01)
*G11B 17/04* (2006.01)

(52) U.S. Cl. ....................................... 720/614
(58) Field of Classification Search ................ 720/614
See application file for complete search history.

(56) References Cited

U.S. PATENT DOCUMENTS

| 5,802,021 | A | * | 9/1998 | Mukaida ................. 369/30.32 |
| 5,970,036 | A | * | 10/1999 | Matsugase ................. 720/614 |
| 6,031,811 | A | | 2/2000 | Umesaki et al. |
| 6,141,314 | A | * | 10/2000 | Umesaki et al. ......... 369/30.92 |
| 6,310,853 | B1 | * | 10/2001 | Ito ............................. 720/607 |
| 6,359,843 | B1 | * | 3/2002 | Motoki .................... 369/30.92 |
| 6,728,168 | B2 | * | 4/2004 | Kido .......................... 369/30.9 |
| 2002/0163863 | A1 | | 11/2002 | Kido |

FOREIGN PATENT DOCUMENTS

| EP | 0 845 778 A2 | 11/1997 |
| EP | 0 845 778 A3 | 11/1997 |
| EP | 1 033 710 A1 | 3/2000 |
| EP | 1 258 875 A1 | 5/2001 |
| JP | 03216857 A | * 9/1991 |
| JP | 06259865 A | * 9/1994 |

* cited by examiner

*Primary Examiner*—Angel Castro
*Assistant Examiner*—Christopher R. Magee
(74) *Attorney, Agent, or Firm*—Lee, Hong, Degerman, Kang & Schmadeka

(57) ABSTRACT

A disk drive includes a main frame; a cartridge slidably installed in the main frame; a plurality of trays stacked in the cartridge and slidably installed therein; an elevation unit for controlling a height of a turn table; a tray selecting unit for locking each tray to a state that each tray can be loaded or unlocking a specific tray among a plurality of locked trays to draw it out of the main frame; a loading unit for loading the specific tray, among the plurality of trays locked by the tray selecting unit to reproduce/record a disk by means of an optical pick-up unit, onto the turn table; and a driving unit for driving the cartridge, the elevation unit, the tray selecting unit and the loading unit.

16 Claims, 24 Drawing Sheets

DISK DRIVE

BACKGROUND OF THE INVENTION

1. Field of the Invention

The present invention relates to a disk drive and, more particularly, to a disk drive capable of accommodating multiple trays and allowing a user to arrange and withdraw a desired specific tray in a desired form.

2. Description of the Background Art

In general, a disk drive is a device for reproducing information recorded in a disk such as a CD (Compact Disk) or a DVD (Digital Versatile Disk) or recording information in the disk. In such a disk drive, when a tray having a disk mounted thereon is loaded into a drive, a drive unit rotates the disk, and as an optical pick-up unit moves in a radial direction, information stored in the disk is reproduced or information is recorded in the disk.

FIG. 1 is a perspective view showing a conventional rotary type disk drive.

With reference to FIG. 1, the conventional rotary type disk drive 10 includes a main body 1, a tray 2 installed to be slidable into the main body 1; a roulette 3 rotatably installed on the tray 2 and having a plurality of disk mounting units 4 for mounting the disk thereon; an optical pick-up unit (not shown) installed inside the main body 1 and reproducing/recording information from/in one of disks mounted on the disk mounting units 4; and a damper 5 installed at an upper portion of the optical pick-up unit and clamping the disk.

In the conventional rotary type disk drive, since the disk mounting units are radially arranged on the basis of a center of the roulette, it is difficult to mount more many disks, and in addition, since the overall size of the disk drive is too large, it is difficult to manage and carry the disk drive.

Moreover, when a user draws a cartridge out of the main body in order to check each tray or change an old disk to a new one, other trays than a specific tray desired by the user are also withdrawn, so it is difficult for the user to use it.

SUMMARY OF THE INVENTION

Therefore, an object of the present invention is to provide a disk drive capable of mounting multiple disks in spite of a relatively small overall size and withdrawing a specific tray desired by a user in a user's desired form when a cartridge is drawn out of a main frame in order to change an old disk to a new one.

To achieve these and other advantages and in accordance with the purpose of the present invention, as embodied and broadly described herein, there is provided a disk drive including: a main frame; a cartridge slidably installed in the main frame; a plurality of disk trays stacked in the cartridge and slidably installed therein; an elevation unit for controlling a height of a turn table; a tray selecting unit for locking each tray to a state that each tray can be loaded or unlocking a specific tray among a plurality of locked trays to draw it out of the main frame; a loading unit for loading the specific tray, among the plurality of trays locked by the tray selecting unit to reproduce/record a disk by means of an optical pick-up unit, onto the turn table; and a driving unit for driving the cartridge, the elevation unit, the tray selecting unit and the loading unit.

The tray selecting unit includes a fixed plate fixed at one side of the main frame and having a plurality of slots at a middle portion; a first level rotatably installed at one side of each slot of the fixed plate to lock each tray; a second lever rotatably installed at the other side of each slot of the fixed plate and interworking with the first lever; a first plate spring fixed at one inner side of the fixed plate and resiliently supporting the first lever; a second plate spring fixed at the other inner side of the fixed plate and resiliently supporting the second lever; and a moving plate movably installed at an outer side of the fixed plate and selectively unlocking a specific tray among the trays locked by the first lever.

The loading unit includes a first loading lever slidably installed at one side of an elevation frame in order to load the specific tray to the turn table of the loading frame; and a second loading lever slidably installed at the other side of the elevation frame in order to mount a disk of the specific tray on the turn table by means of the first loading lever.

The driving unit includes a first driving unit for driving the cartridge and the elevation unit; and a second driving unit for driving the tray selecting unit and the disk loading unit.

The first driving unit includes a cam rotatably coupled by a shaft to the main frame and having a first arm path at a central portion of an upper surface thereof; a first driving unit installed at the main frame and having a driving motor and a plurality of reduction gears; a cartridge transfer pinion for rotatably installed at the main frame so as to be engaged with a rack formed at a lower portion of the cartridge; an elevation pinion positioned between the cartridge transfer pinion and the cam, and rotatably installed at the main frame in order to transfer a driving force to the elevation unit; a first arm having a follower formed at one side thereof and inserted in a first path so as to be movable along the first path of the cam, and an idle gear installed at the other side and selectively transferring a driving force of the second driving unit to the cartridge transfer pinion or to the elevation pinion.

The second driving unit includes a cam having a first select gear teeth, a second select gear teeth and a third select gear teeth formed at its circumference; a second driving unit installed at the main frame so as to rotate the cam and having a driving motor and a plurality of reduction gears in mesh with the cam; a first tray select gear rotatably installed at the main frame so as to be engaged with the first select gear teeth; a second tray select gear rotatably installed at the main frame so as to be engaged with the second select gear teeth; a first tray select pinion rotatably installed at the main frame so as to be engaged with the second tray select gear; a second tray select pinion rotatably installed at the main frame so as to connect the first tray select pinion and a rack formed at the lower portion of the moving plate of the tray select unit; a tray loading gear rotatably installed at the main frame so as to be engaged with the third select gear teeth; and a tray loading pinion rotatably installed at the main frame so as to connect the tray loading gear and a rack formed at the first loading lever of the loading unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
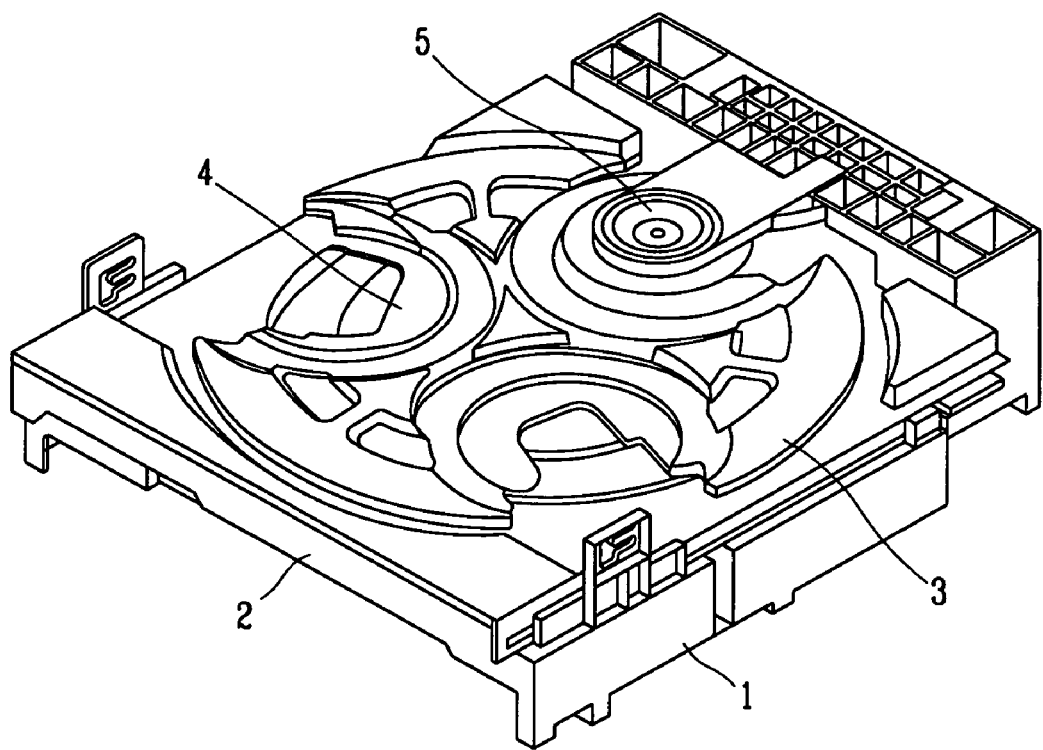
FIG. 1 is a perspective view showing a rotary type disk drive in accordance with a conventional art.

Reference will now be made in detail to the preferred embodiments of the present invention, examples of which are illustrated in the accompanying drawings.

A disk drive 1000 in accordance with a preferred embodiment of the present invention is a stack type disk drive having a five-stage tray, including: a main frame 100; a cartridge 200 slidably installed in the main frame 100; a plurality of disk trays 300 stacked in the cartridge and slidably installed therein; an elevation unit 400 for controlling a height of a turn table 105; a tray selecting unit 500 for supporting each tray 300 to a loading state or drawing a specific tray, among a plurality of trays 300, out of the main frame 100; a loading unit 600 for loading the specific tray (or selected tray), among the plurality of trays 300 locked by the tray selecting unit 500 to reproduce/record a disk by means of an optical pick-up (not shown), onto the turn table; and driving units 700 and 800 for driving the cartridge 200, the elevation unit 400, the tray selecting unit 500 and the disk loading unit 600.

The cartridge 200 is positioned at a front side of the main frame 100 and is slid into or out of the main frame 100 by means of the driving unit 800.

Five tray rail grooves 210 are formed at vertically equal intervals at both inner sides of the cartridge 200 so that each tray 300 can be slidably inserted therein.

An elevation frame 101 is installed at a rear side of the main frame 100 so as to ascend or descend by means of an elevation unit 400. A loading frame 102 where the turn table 105 is installed at a lower portion of the elevation frame 101 is formed to be rotatable at a certain angle centering around a hinge 103.

The elevation unit 400 controls the loading frame 102, the elevation frame 101 and a first loading lever 610 to level with a specific tray and inserts a loading hook 613 of the first loading lever 610 into a second groove 130b of the selected tray 300, right before it loads the selected tray 300 to the turn table 105. The elevation unit 400 is a general technique, so detailed descriptions therefor are omitted.

After the loading frame 102, the elevation frame 101 and the first loading lever 610 are controlled as high as the specific tray by means of the elevation unit 400, the loading hook 613 of the loading unit 600 loads only the specific tray onto the turn table 105. At this time, in order for the loading hook 613 of the loading unit 600 to load only the specific tray, the other remaining trays are to be resiliently locked, for which the tray selecting unit 500 works.

In addition, when a user draws the cartridge 200 out of the main frame 100 in order to check a disk of the tray or change an old disk to a new one of each tray, the tray selecting unit 500 draws the specific tray out of the main frame 100, draws the entire trays out of the main frame 100, or draws each tray out of the main frame 100 in a stairway form.

The tray selecting unit 500 includes a fixed plate 510 where four slots 511 are formed uniformly at the middle portion thereof; a first lever 520 installed at one side of each slot 511 of the fixed plate 510 so as to be rotatable centering around a hinge part 510a to resiliently lock each tray; a second lever 530 installed at the other side of each slot 511 of the fixed plate 510 so as to be rotatable centering around a hinge part 510b to interwork with the first lever 520; a first plate spring 540 fixed at one inner side of the fixed plate 510 in order to resiliently support the first lever 520; a second plate spring 550 fixed at the other inner side of the fixed plate 510 in order to resiliently support the second lever 530; and a moving plate 560 movably installed at an outer side of the fixed plate 510 so as to selectively unlock a specific tray among a plurality of trays locked by the first lever 520.

A first head to be inserted into the first groove 300a formed at the tray 300 is formed at one side of an inner surface of the first lever 520, and first protrusion 522 and second protrusion 523 are formed at both sides of an outer surface of the first lever 520 at a certain interval therebetween.

A slot 511 of the fixed plate 510 includes a horizontal slot 511a into which the first head 521 of the first lever is inserted and a vertical slot 511b into which a second head 531 of the second lever 530 is inserted.

Four release protrusions 561 for pressing the second protrusion 523 of the first lever 520 are formed at equal intervals up and down, which are formed with lengths diminishing and stepped as it goes from the lowermost protrusion to an uppermost protrusion. A locking groove 562 is formed at one side of the release protrusion 561 and a release groove 563 is formed at the other side thereof.

A second head 531 is formed at one side of the second lever 530. The second head 531 of the second lever 530 is formed lower than the first head 521 of the first lever 520 as indicated by 'D'.

Four rails 221 are formed at equal intervals up and down at an outer side of the cartridge 200 in the drawing so as to be in contact with the second head 531 sequentially. The rails 221 have lengths diminishing and stepped as it goes from the lowermost rail to the uppermost rail.

Four slots 570 are formed at the side of the cartridge 200, which is adjacent to each rail 221 at equal intervals up and down, into which the first head 521 and the second head 531 are inserted.

The reason of forming the release protrusions 561 of the moving plate 560 in a step form is to draw a specific tray out of the main frame 100 (at this time, a lower tray of the specific tray is also withdrawn) or all the trays out of the main frame 100, when the user intends to draw the cartridge 200 out of the main frame 100 so as to check each tray or change an old disk to a new one.

The reason of forming the rails 221 of the cartridge 220 in a step form is to enable each rail 221 to sequentially push the second head 531 of the respective second levers 530 and the first head 521 of the first lever 520 to be sequentially unlocked from the first groove 300a of the tray 300 so that each tray can be drawn out of the main frame 100 by stages, when the user intends to draw the cartridge 200 out of the main frame 100 so as to check each tray or change an old disk to a new one.

The first plate spring 540 and the second plate spring 550 are fixed at both inner sides of the fixed plate 510 by a general engaging unit, i.e., a screw (not shown).

The first plate spring 540 has four branched portions to support respective first levers 520, and the second plate spring 550 also has four branched portions to support respective second levers 530.

Figure 8:
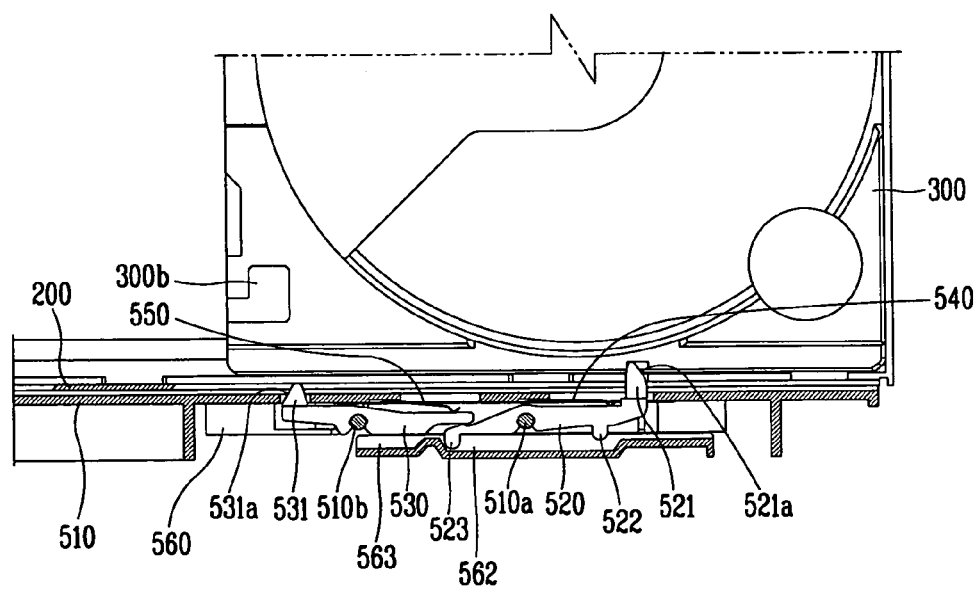
FIG. 8 is a plane sectional view showing a tray locked by the tray selecting unit in the disk drive in accordance with the present invention.

FIG. 8 shows a state that the tray selecting unit elastically locks each tray before loading that a specific tray is unlocked from the first lever and the second lever.

As shown in FIG. 8, the first plate spring 540 supports the first lever 520 in a direction that the first head 521 of the first lever 520 is unlocked from the first groove 300a of each tray 300, namely, outwardly of the fixed plate 510.

The second plate spring 550 supports the second lever 530 in a direction that the second head 531 of each second lever 530 is in contact with the rail 221, and also supports each first lever 520 in a direction that the first head 521 of each first lever 520 is inserted into the first groove 300a of each tray 300.

At this time, the first protrusion 522 and the second protrusion 523 of each first lever 520 is inserted in each release groove 563. In other words, each first lever 520 can be rotated clockwise centering around the hinge part 510a, and at this time, each first head 521 is in a state of being released from the first groove 300a.

The first lever 520 can be rotated clockwise centering around the hinge part 510a by virtue of an elastic force, and the second lever 530 also can be rotated clockwise centering around the hinge part 510b by virtue of the elastic force of the second plate spring 550. Because the second plate spring 550 has a greater elastic coefficient than the first plate spring 540, the first lever 520 and the second lever 530 are all under the control of the elastic force of the second plate spring 550.

An end portion 521a of the first head 521 of the first lever 520 and an end portion 531a of the second head 531 of the second lever 530 have a slope form.

As mentioned above, with the end portion 521a of the first head 521 inclined, a first loading lever 610 of the loading unit 600 can load a specific tray to the turn table 105 by overcoming an elastic force of the second plate spring 530 in a loading mode.

Also, because the end portion 531a of the second head 531 is inclined, when the user draws a specific tray out of the main frame 100 in order to check a disk or change an old disk to a new one, each can be arranged by stages.

As afore-mentioned, the first head 521 of the first lever 520 under the control of the second plate spring 550 is locked in the first grove 300a of the tray 300, each tray 300 is not moved.

In this state, when the user selects a reproduction mode, the driving unit 700 operates to actuate the elevation unit 400. The actuated elevation unit 400 suitably controls the height of the turn table 105.

At this time, the loading frame 102 is rotated downwardly centering around the hinge 103 in order to receive the specific tray onto the turn table 105.

Thereafter, with the loading hook 613 of the first loading lever 610 inserted in the second groove 300b of the tray 300, the first loading lever 520 pulls the specific tray to the turn table 105 to load by overcoming an elastic force of the second plate spring 550.

Since the end portion 521a of the first head 521 is inclined, when the specific tray 300 is loaded, it presses the end portion 521a of the first head 521. At this time, the first lever 550 is rotated clockwise centering around the hinge 510a and then the first head 521 is released from the first groove 300a.

Namely, when the loading unit 600 forcibly pulls the specific tray to load it to the turn table 105 by overcoming the elastic force of the second plate spring 550, the first head 521 of the first lever 520 is released from the first groove 300a of the specific tray.

At this time, the second lever 530 is also rotated counterclockwise centering around the hinge part 510b, it does not make a particular function.

A different embodiment of the structure of first head of the first lever and the first groove of the tray will now be described.

Figure 9:
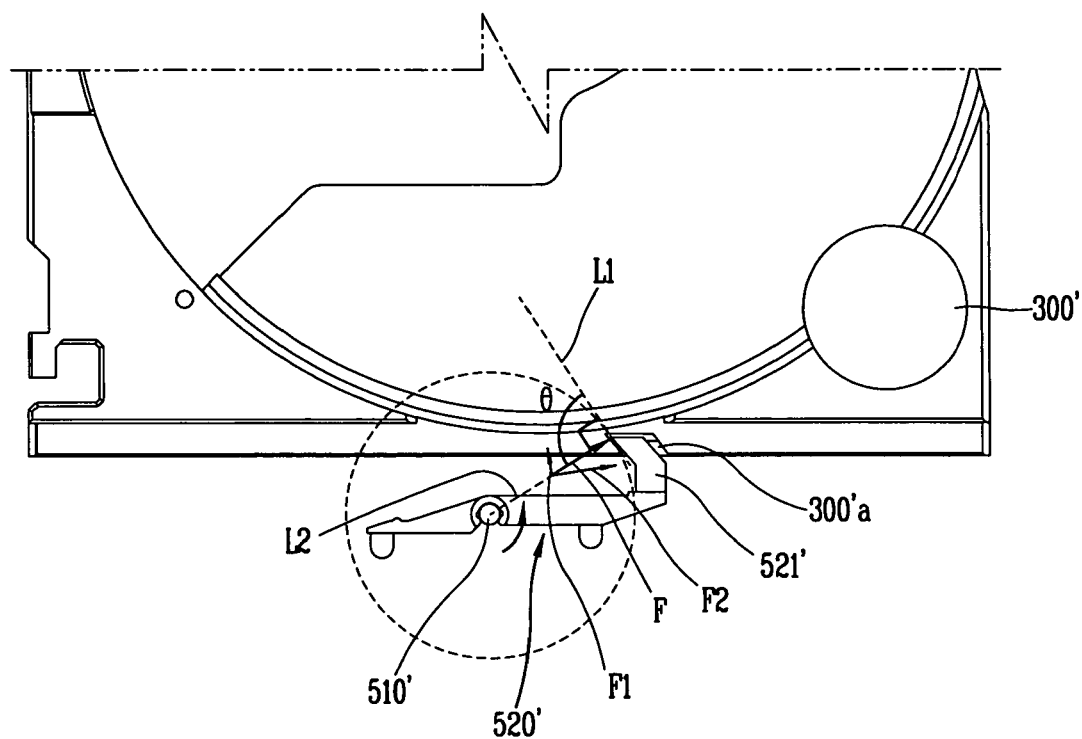
FIG. 9 is a plane sectional view showing a head of a first lever and a first groove of the tray.
Figure 10:
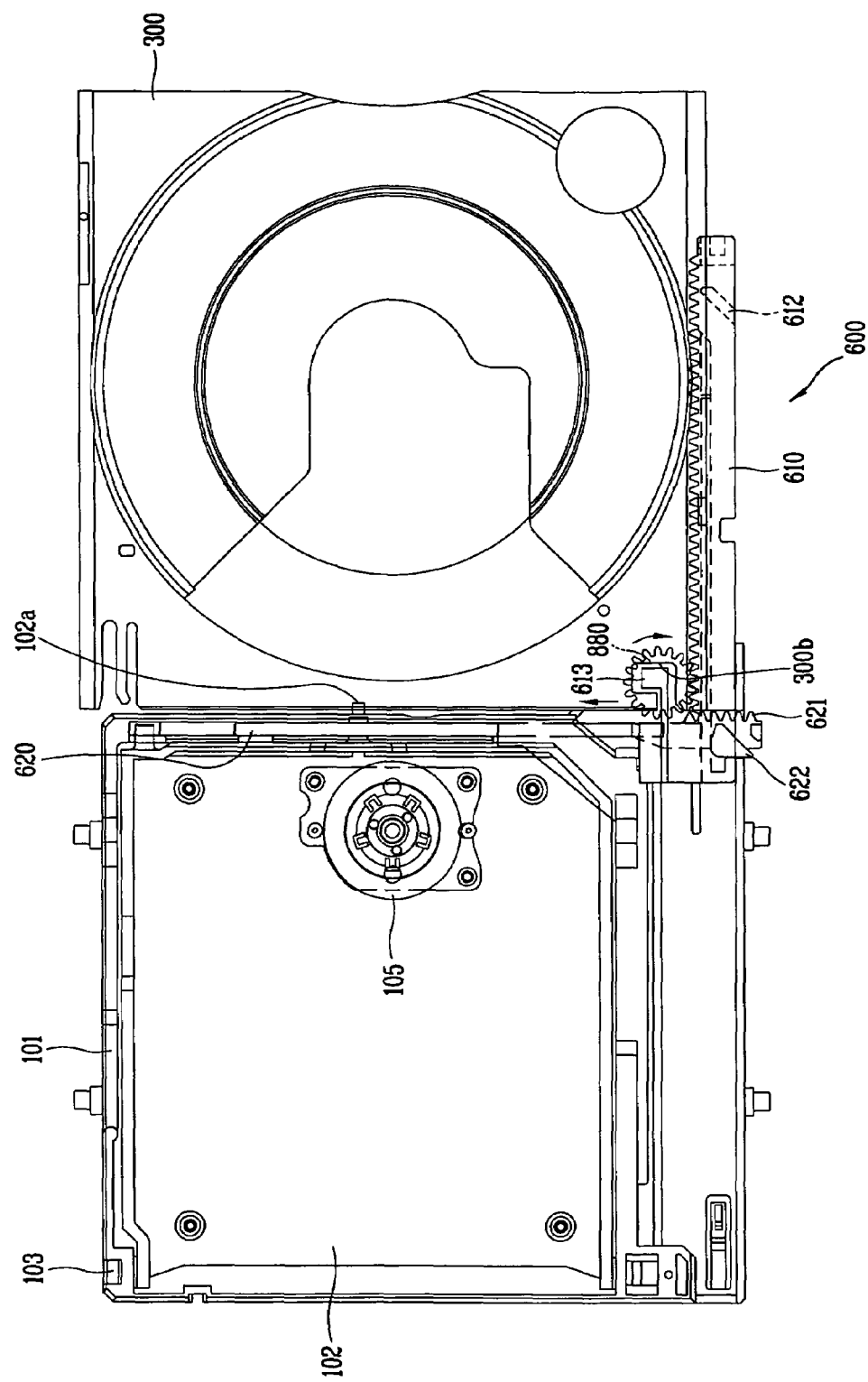
FIG. 10 is a plan view showing a state before loading.
Figure 11:
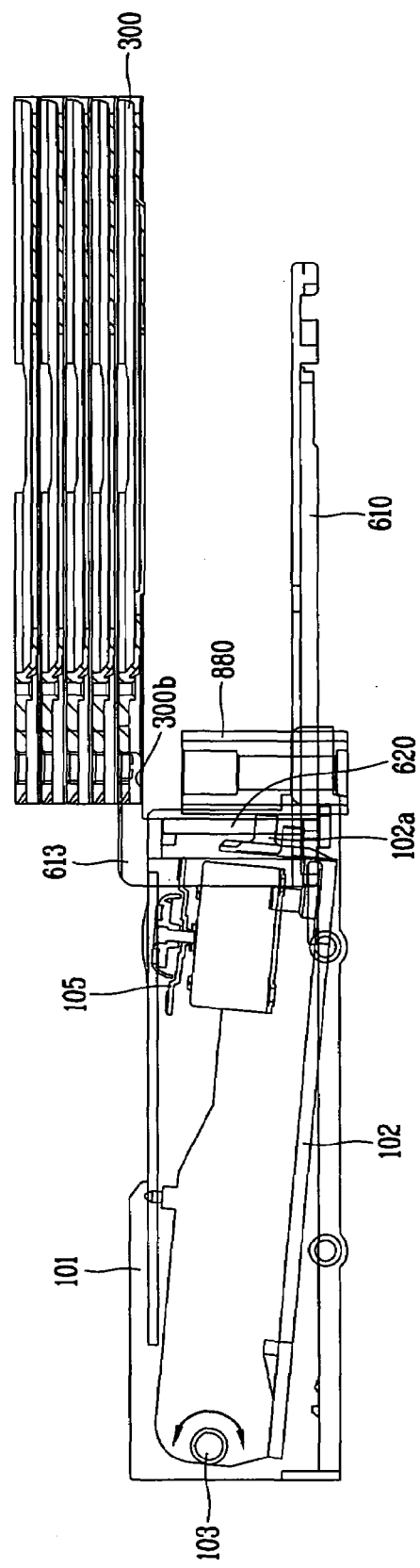
FIG. 11 is a side view of FIG. 10.
Figure 12:
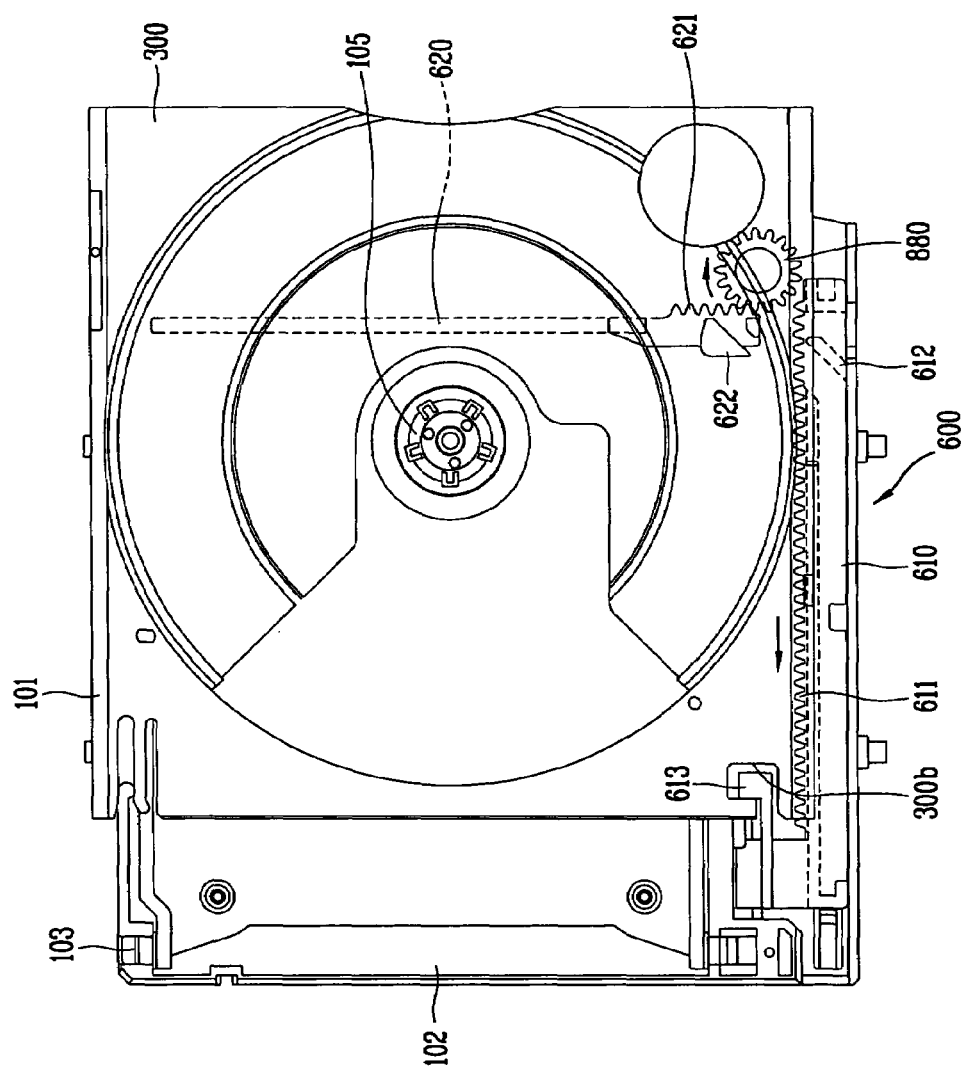
FIG. 12 is a plan view showing a state after loading.
Figure 13:
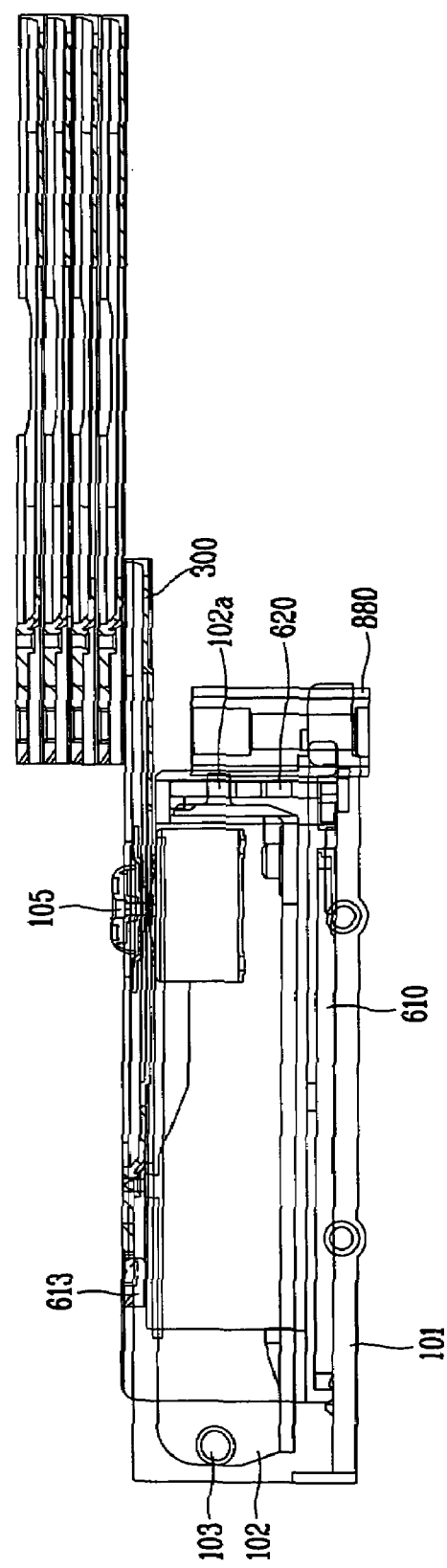
FIG. 13 is a side view of FIG. 12.

As shown in FIG. 9, it can be defined that, based on the hinge 510a', a line circumscribed with a virtual circle (indicated in dotted line) which is inscribed with the first head 521' is L1, a line connecting a center of the circle and a contact point between the circle and L1 is L2, an angle made by L1 and L2 is θ, a force working to unlock the tray 300' locked by the first head 521' is 'F' which is divided into a vertical component force F1 and a horizontal component force F2. Herein, F1 is a force working to rotate the first lever 520' counterclockwise and F2 is a force generated when the tray is drawn out of the main frame.

By designing the first head 521' and the first groove 300a' such that the angle θ made by L1 and L2 is maintained at 90°, the force for locking the tray 300' can be improved and the tray 300' can be locked to or unlocked from a suitable position timely, thereby enhancing reliability of a product.

With reference to FIGS. 10 to 13, the disk loading unit 600 loads a specific tray desired to be reproduced/recorded by the user to the turn table 105, among a plurality of trays locked by the tray selecting unit 500.

The disk loading unit 600 includes a first loading lever 610 slidably installed at one side of an elevation frame in order to load the specific tray to the turn table of the loading frame; and a second loading lever 620 slidably installed at the other side of the elevation frame 101 in order to mount a disk loaded by the first loading lever 610 on the turn table 105.

The first loading lever 610 loads a specific tray to the turn table 105 by being slid from the front side of the main frame 100 to the rear side by rotation (namely, driving) of a loading pinion 880 of the second driving unit 800 (to be described), or unload a specific tray out of the turn table 105 by being slid in the opposite side.

To play such a role, the first loading lever 610 includes a rack 611 at an inner surface thereof, a first slope protrusion 612 is formed at the front side of the main frame 100, and a loading hook 613 is formed at the rear side of the main frame 100 so as to be selectively inserted into the second groove 300b formed at the tray 300.

The second loading lever 620 makes an engaging protrusion 102a of the loading frame 102 inserted in an ascending/descending groove 623 of the second loading lever 620 ascend by being slid from the left side to the right side of the main frame 100 on the drawing by a pressure of the first loading lever 610 and later by rotation of the loading pinion 880 of the second driving unit 180.

At this time, the loading frame 102 rotates upwardly centering around the hinge 103 to mount the loaded disk on the turn table 105.

For such function, the second loading lever 620 includes a rack 621 at its inner surface, and a second slope protrusion 622 is formed at one end of the second loading lever 620 in order to horizontally move the second loading lever 620 by contacting with a first slope protrusion 612.

The ascending/descending groove 623 is formed at the other side of the second loading lever 620.

The operation of loading a specific tray to the turn table 105 will now be described with reference to FIGS. 10 to 13.

Figure 2:
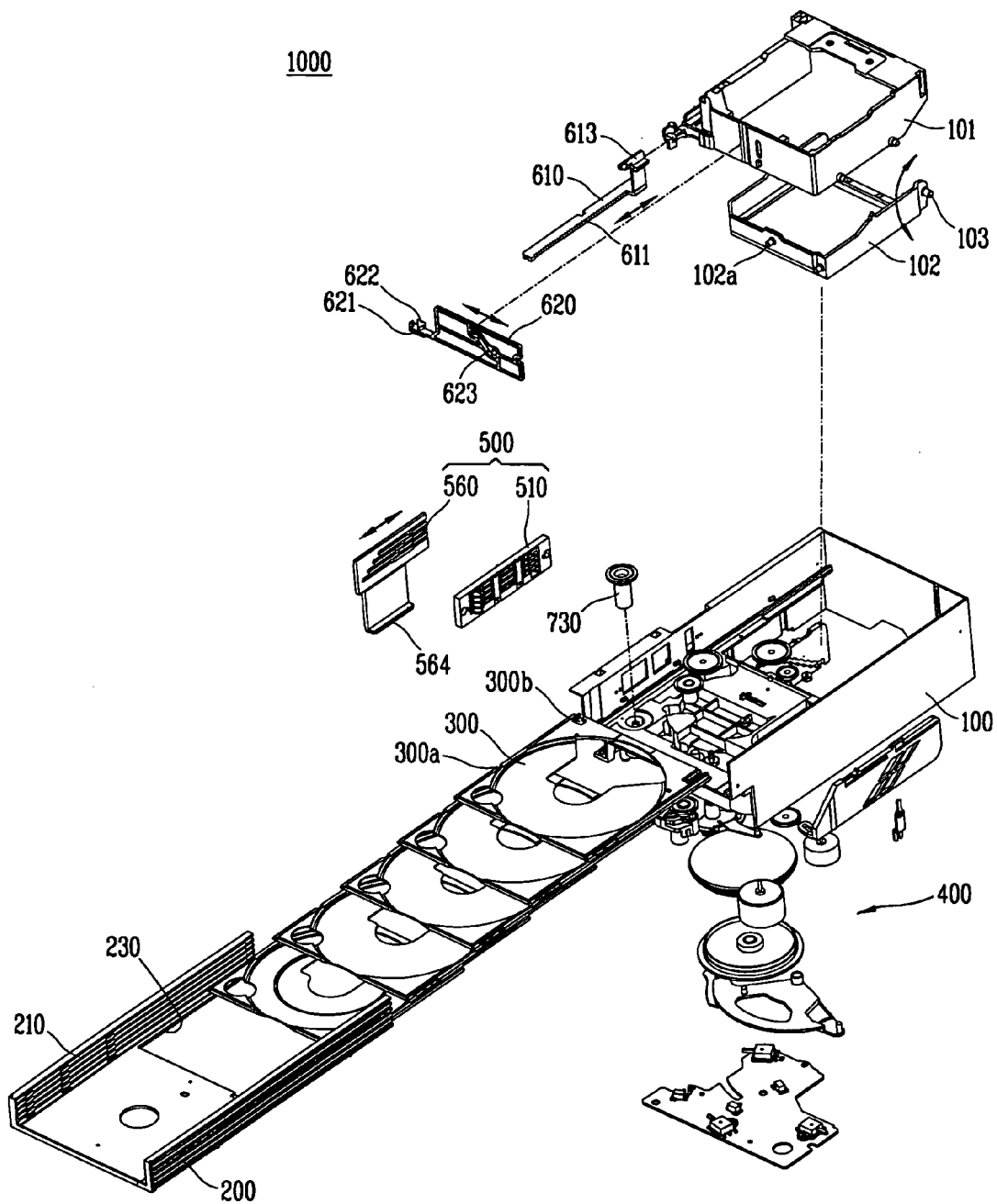
FIG. 2 is an exploded perspective view showing a disk drive in accordance with the present invention.
Figure 3:
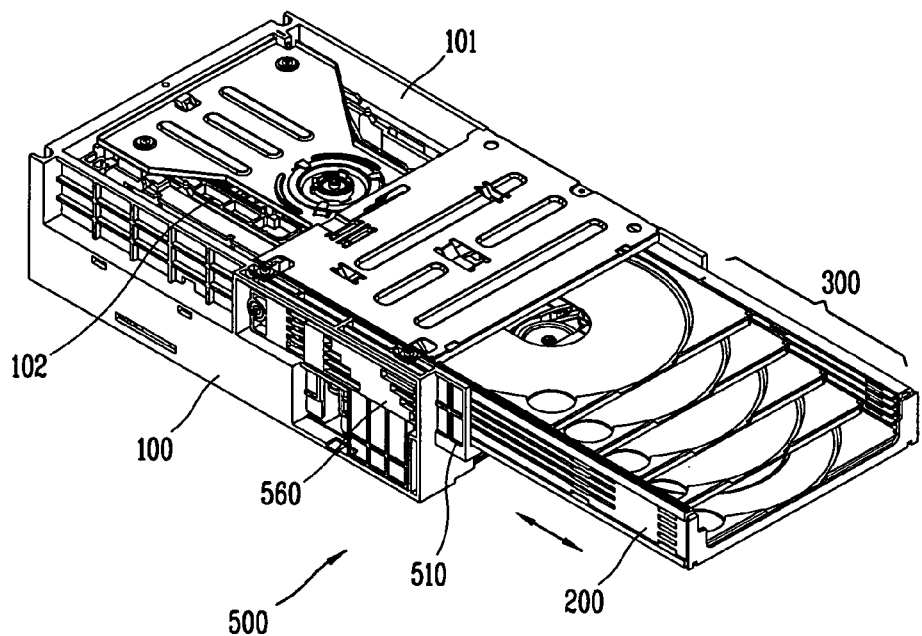
FIG. 3 is an assembled perspective view showing the disk drive in accordance with the present invention.
Figure 4:
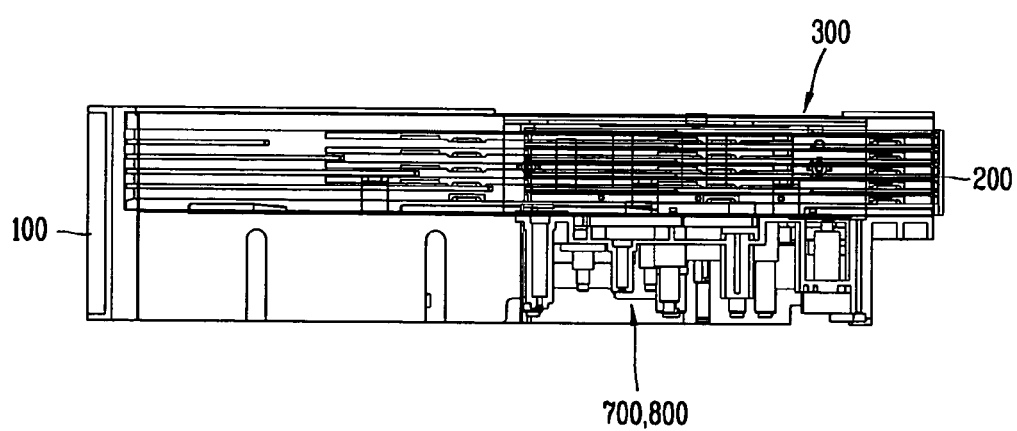
FIG. 4 is a side view for showing a position of a driving unit in accordance with the present invention.
Figure 5:
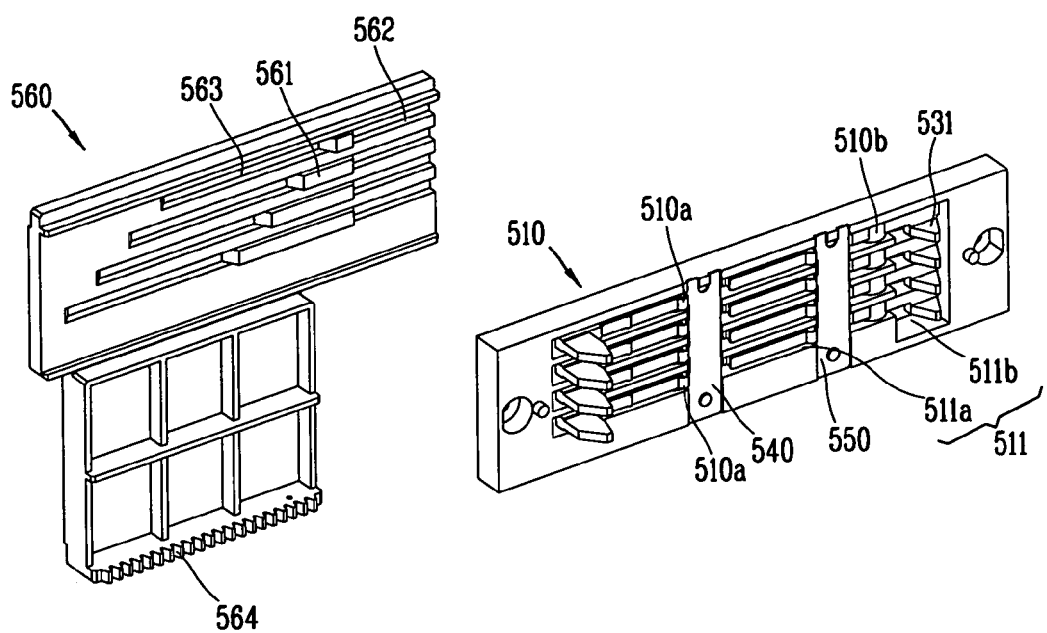
FIG. 5 is an exploded perspective showing a tray selecting unit in accordance with the present invention.
Figure 6:
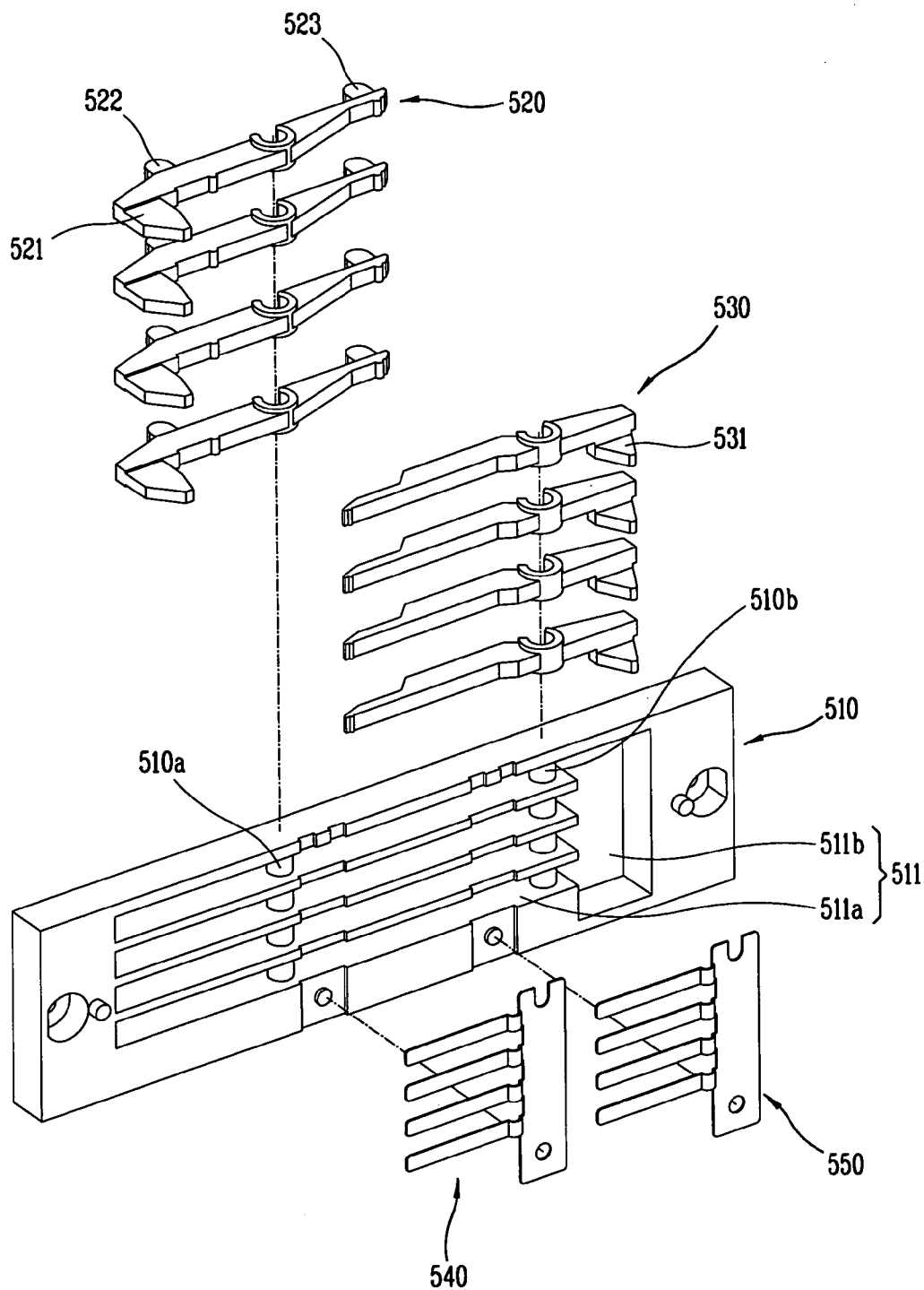
FIG. 6 is an exploded perspective showing a lever and a plate spring coupled to a fixed plate in accordance with the present invention.
Figure 7:
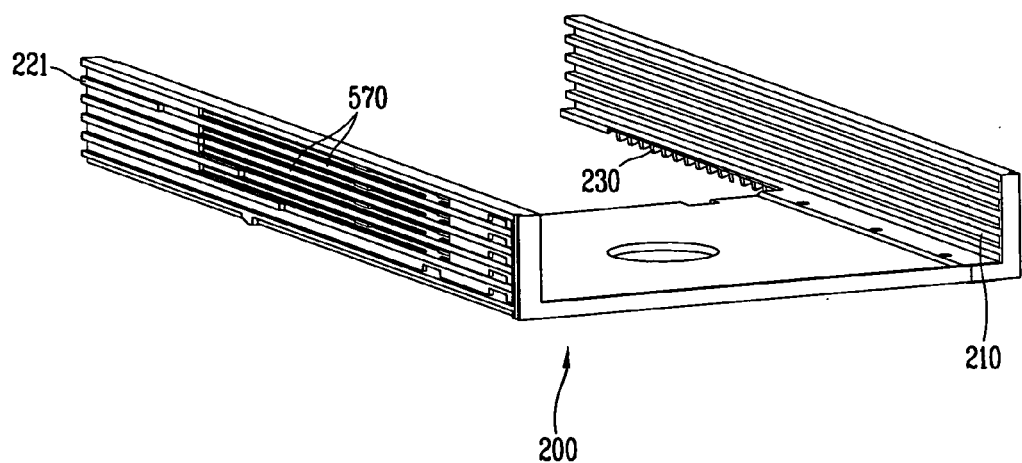
FIG. 7 is a perspective view showing a cartridge.

First, the elevation unit 400 (refer to FIG. 2) controls the loading frame 102, an elevation frame 101 and the first loading lever 610 to a height corresponding to a specific tray. At this time, the loading hook 613 of the first loading lever 610 is in a state of being inserted in the second groove 300b of the specific tray in order to load only the specific tray.

In this state, the loading pinion 880 is in mesh with the rack 611 of the first loading lever 610, so that the first loading lever 610 is slid toward the rear side of the main frame 100 by driving of the loading pinion 880 of the second driving unit 800 to thereby load the specific tray into the loading frame 102.

Right before the first loading lever 610 is finished its moving, the first slope protrusion 612 of the first loading lever 610 presses the second slope protrusion 622 of the second loading lever 620 in a direction of an arrow, to thereby move a bit the second loading lever 620 toward the direction of arrow.

At this time, the rack 621 of the second loading lever 620 is in mesh with the loading pinion 880, and the second loading lever 620 is moved further in the direction of arrow by driving of the loading pinion 880.

As the engaging protrusion 102a of the loading frame 102 ascends by the movement of the second loading lever 620, the loading frame 102 ascends centering around the hinge 103, and at this time, the turn table 105 ascends and the loaded disk is mounted thereon.

Meanwhile, the operation of unloading the disk from the turn table 104 is performed in the opposite order of the loading operation.

The driving units 700 and 800 includes the first driving unit 700 for changing a driving force by an idler gear 751 installed at a first arm 750 moving along a path 713 of a cam 710 by using a first driving part 720 as a driving source and a second driving unit 800 for rotating the cam 710 by using a second driving unit 821 as a driving source and driving the tray selecting unit 500 and the disk loading unit 600 by means of a plurality of gears in mesh with the cam 710.

The first driving unit 700 includes the cam 710 and rotatably coupled by a shaft 712 to the main frame 100 and having a first path 713 at a central portion of an upper surface thereof; a first driving part 720 installed at the main frame 100 and having a driving motor 721 and a plurality of reduction gears 722; a cartridge transfer pinion 730 for rotatably installed at the main frame 100 so as to be engaged with a rack 208 formed at a lower portion of the cartridge 200; an elevation pinion 740 positioned between the cartridge transfer pinion 730 and the cam 710, and rotatably installed at the main frame in order to transfer a driving force to the elevation unit; a first arm 750 having one side inserted in the first path 713 so as to be movable along the first path 713 of the cam 710, and an idle gear installed at the other side and selectively transferring a driving force of the first driving part 720 to the cartridge transfer pinion 730 or to the elevation pinion 740.

The second driving unit 800 includes a cam 710 rotatably coupled to the main frame 100 and having a first select gear teeth 811, a second select gear teeth 812 and a third select gear teeth 813 formed at its circumference; a second driving part 820 installed at the main frame 100 so as to rotate the cam 710 and having a driving motor 821 and a plurality of reduction gears 822 in mesh with the cam 710; a first tray select gear 830 rotatably installed at the main frame 100 so as to be engaged with the first select gear teeth 811; a second tray select gear 840 rotatably installed at the main frame 100 so as to be engaged with the second select gear teeth 812; a first tray select pinion 850 rotatably installed at the main frame 100 so as to be engaged with the second tray select gear 840; a second tray select pinion 860 rotatably installed at the main frame 100 so as to connect the first tray select pinion 850 and a rack 564 formed at the lower portion of the moving plate 560 of the tray select unit 500; a tray loading gear 870 rotatably installed at the main frame 100 so as to be engaged with the third select gear teeth 813; and a tray loading pinion 880 rotatably installed at the main frame 100 so as to connect the tray loading gear 870 and a rack 611 formed at the first loading lever 610 of the loading unit 600.

The first select gear teeth 811, the second select gear teeth 812, the third select gear teeth 813 are coaxially formed at certain intervals in an arc shape. The first select gear teeth 811, the second select gear teeth and the third select gear teeth 813 are sequentially formed from the center of the cam 710 toward outside.

Figure 18:
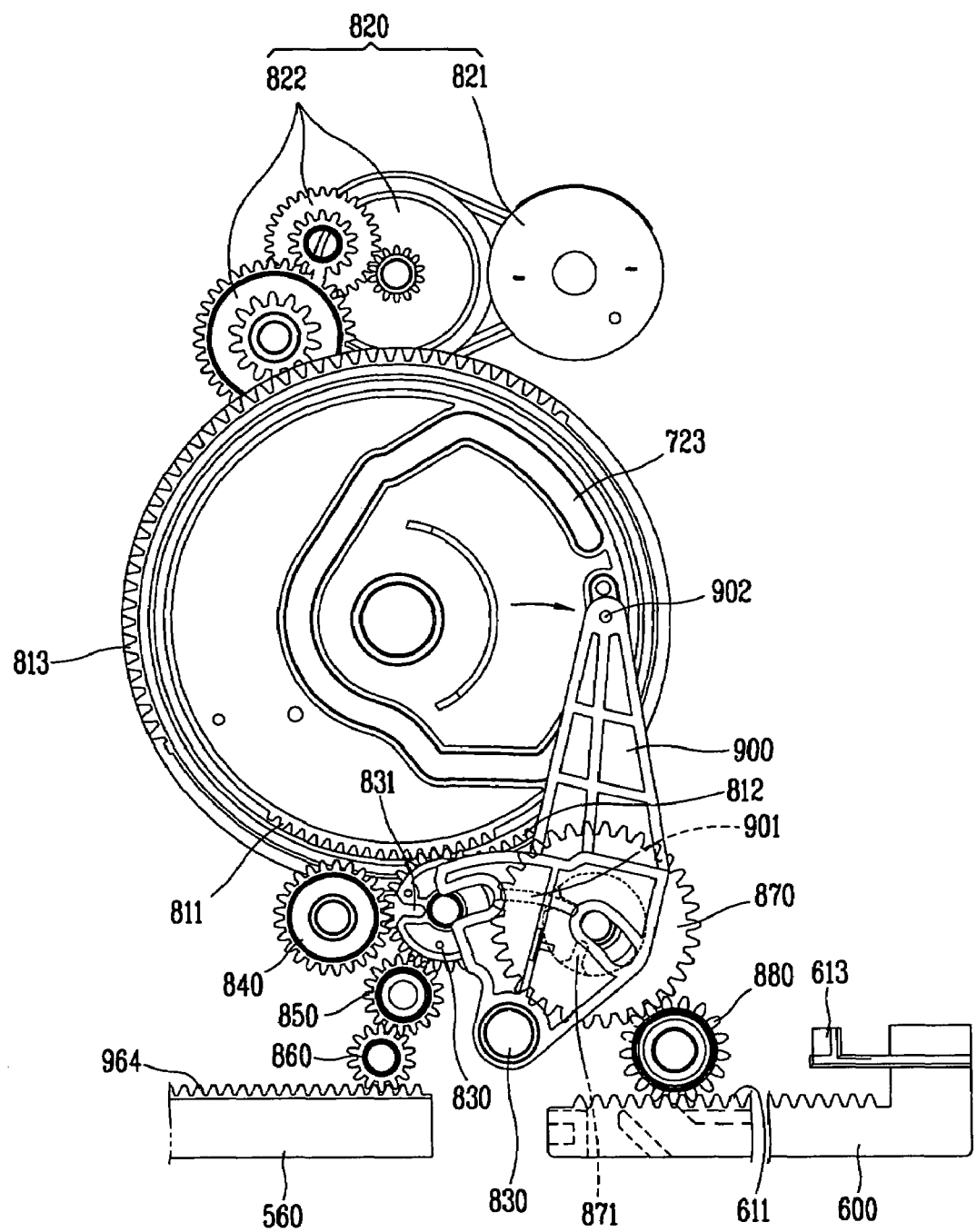
FIG. 18 is a bottom view showing fixing a loading gear by a second arm.
Figure 19:
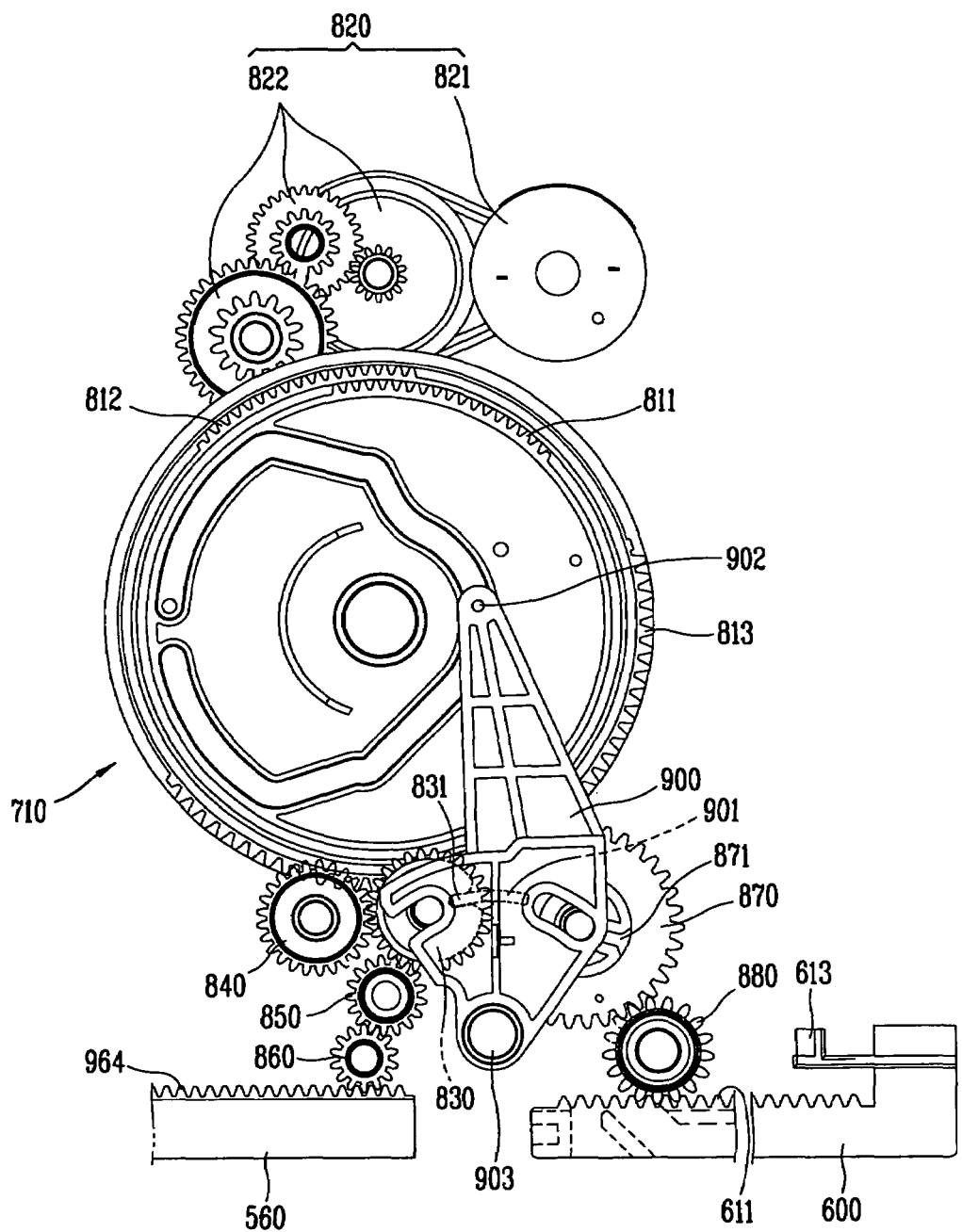
FIG. 19 is a bottom view showing fixing a second tray select gear by the second arm.
Figure 20:
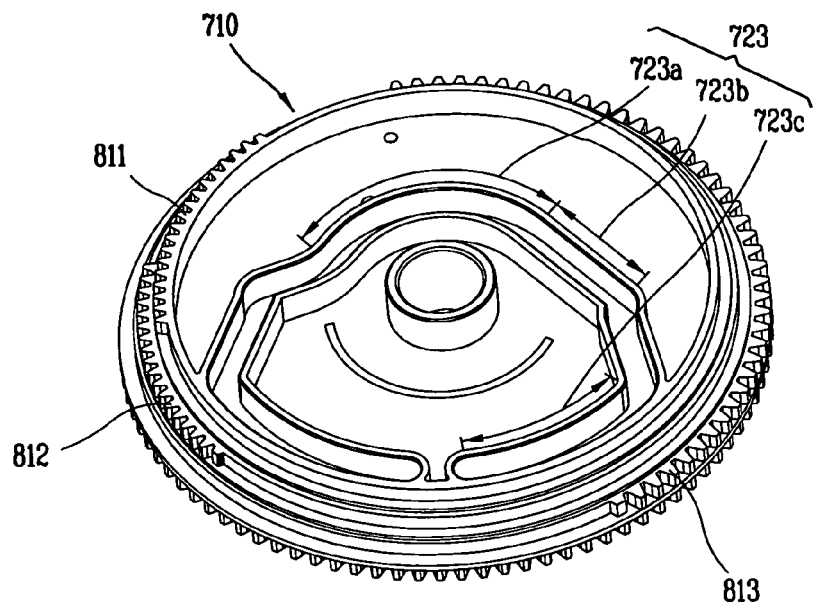
FIG. 20 is a perspective view showing a second path formed at a lower surface of a cam.
Figure 21:
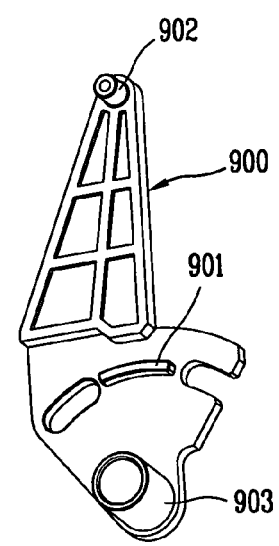
FIG. 21 is a perspective view showing the second arm.

FIG. 18 is a bottom view showing fixing the loading gear by the second arm, FIG. 19 is a bottom view showing fixing the second tray select gear by the second arm, and FIG. 20 is a perspective view showing the second path formed at the lower surface of the cam.

As shown in FIGS. 18, 19 and 20, a second arm 900 is installed between the tray loading gear 870 and the first tray select gear 830 to control rotation and driving power transmission of the tray loading gear 870 and the first tray select gear 830 while moving along the second path 723 formed at the a lower surface of the cam 710.

A follower 902 is formed at one side of the second arm 900 and moved along the second path 723 formed at the lower surface of the cam 710 and the other side of the second arm 900 is hinge-coupled by a hinge 903 at the main frame 100.

A locking protrusion 901 is formed at a middle portion of the second arm 900 so as to be selectively inserted into the locking grooves 871 and 831 respectively formed at the tray loading gear 870 and the first tray select gear 830.

The second path 723 is divided into a first section 723a, a second section 723b and a third section 723c, and when the follower 902 of the second arm 900 is positioned at each section, operations of the first tray select gear 830 and the tray loading gear are selectively controlled.

Figure 17:
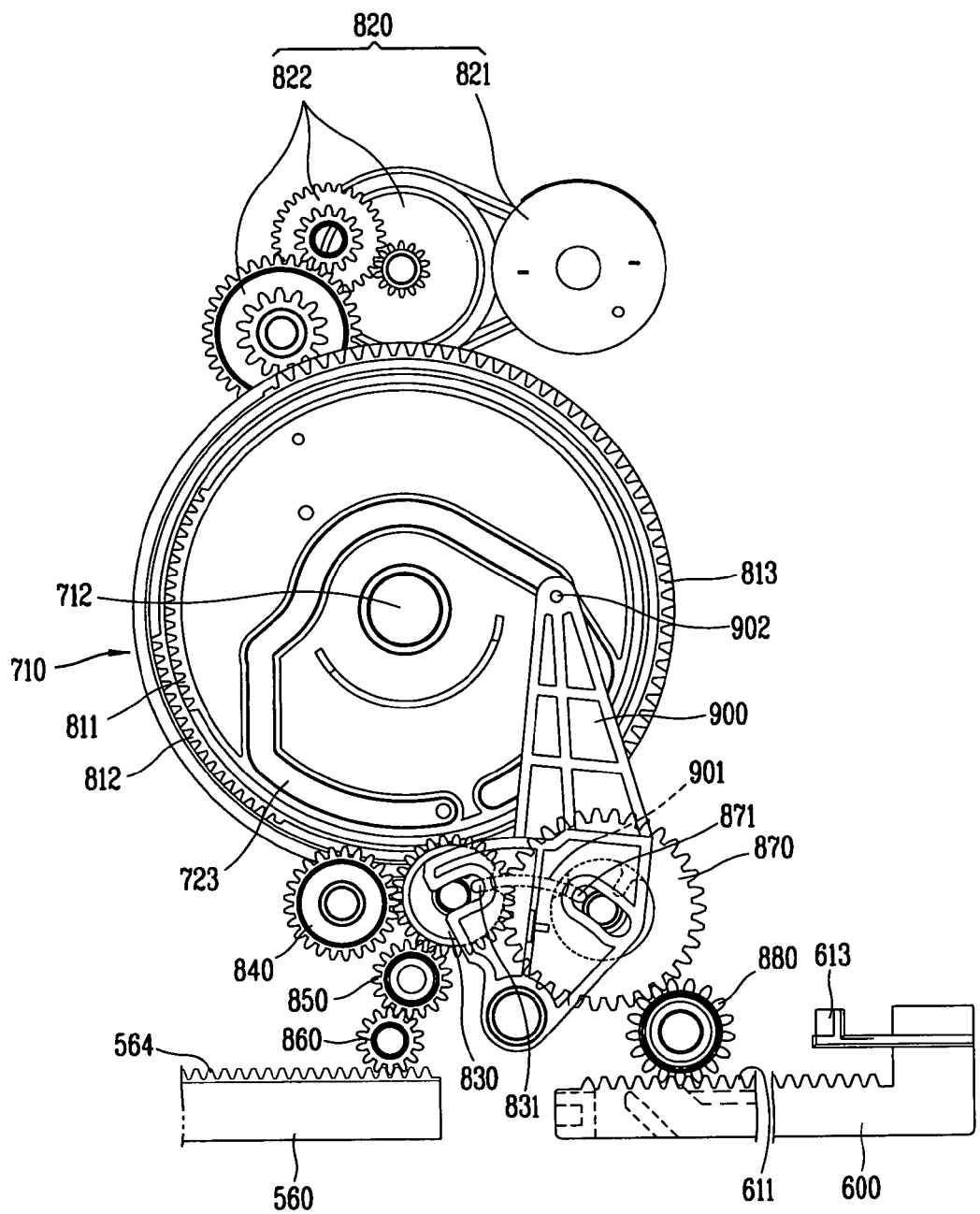
FIG. 17 is a bottom view of a second driving unit.

As shown in FIG. 17, when the follower 902 of the second arm 900 is positioned at the second section 723b, the first tray select gear 830 and the tray loading gear 830 are fixed and cannot transfer a driving force.

As shown in FIG. 18, when the follower 902 of the second arm 900 is positioned at the third section 723c, the first tray select gear 830 is rotated to transfer a driving force but the tray loading gear 870 is fixed and cannot transfer a driving force.

As shown in FIG. 19, when the follower 902 of the second arm 900 is positioned at the first section 723a, the first tray select gear 830 is fixed and cannot transfer a driving force but the tray loading gear 870 is rotated to transfer a driving force.

According to the movement of the second arm 900 moving along the second path 723 of the cam 710, rotation of the first tray select gear 830 and the tray loading gear 870 can be selectively controlled.

The operation of drawing a specific tray out of the main frame so as for the user to check a disk of the tray or change an old disk to a new one will now be described with reference to FIGS. 22A and 22B.

As mentioned above, since each first head 521 of each first lever 520 is inserted in the first groove 300a of the tray 300, each tray 300 is locked without being moved.

Figure 22A:
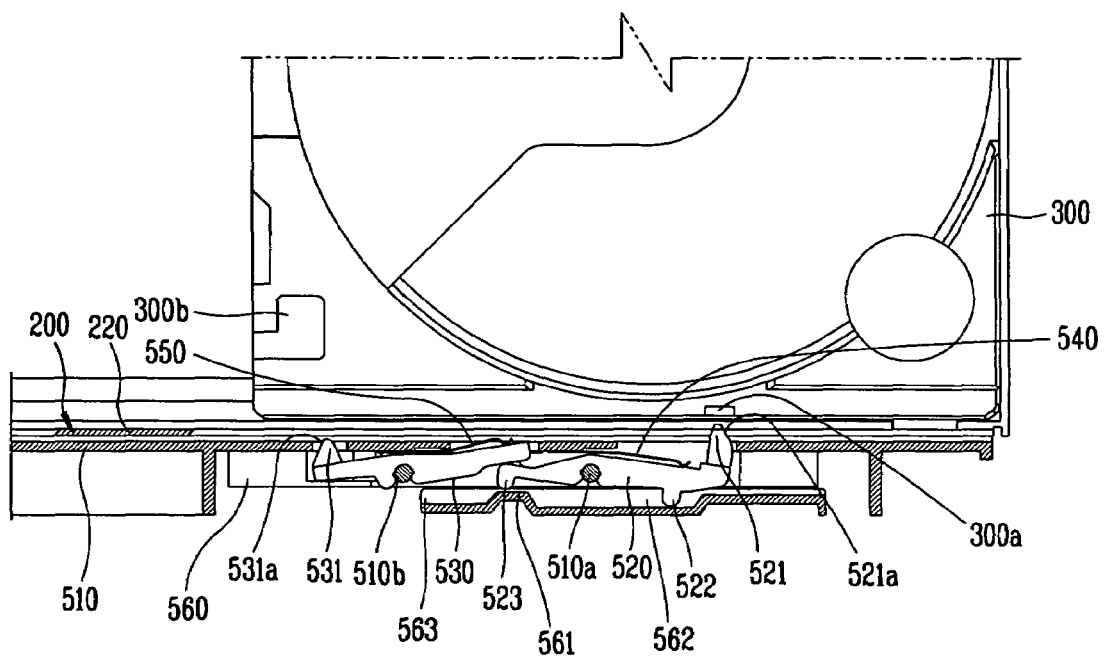
FIG. 22A is a plane and sectional view showing a mode for withdrawing a specific tray during a process of withdrawing a cartridge.

In this state, as shown in FIG. 22A, when the moving plate 560 is moved as long as a suitable distance in a direction of the arrow in order to unlock a specific tray, a corresponding release protrusion 561 of the moving plate 560 pushes a corresponding second protrusion 523 toward the tray. At this time, the first lever 520 is rotated clockwise centering around the hinge part 510a and the first head 521 is released from the first groove 300a.

Figure 23A:
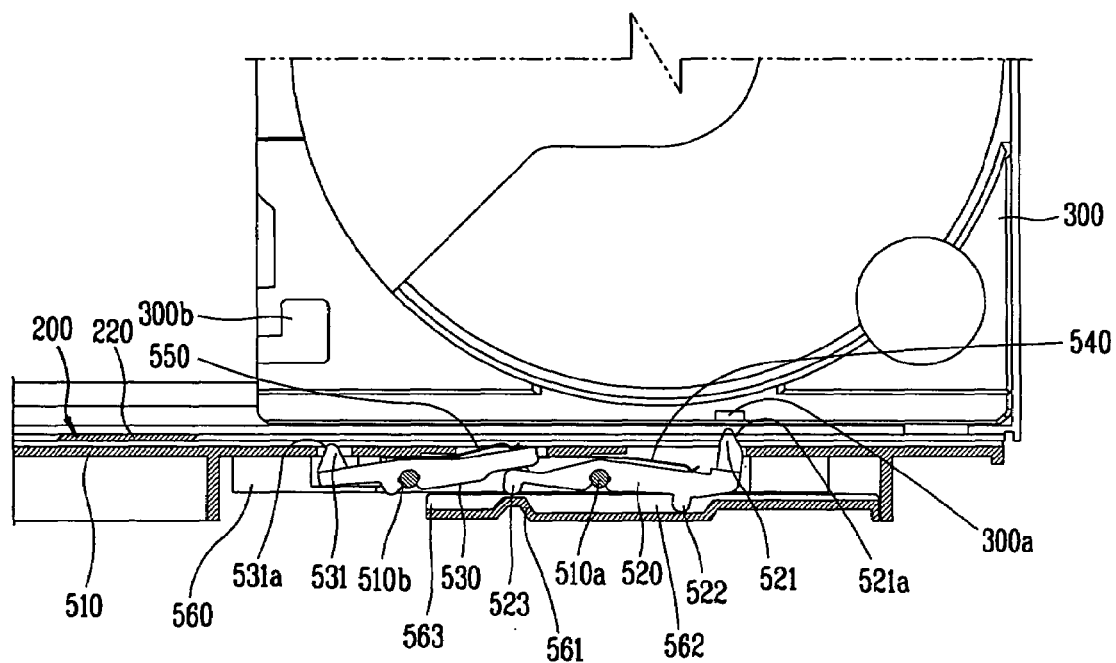
FIG. 23A is a plane and sectional view showing a mode for withdrawing all the trays during a process of withdrawing the cartridge.
Figure 23B:
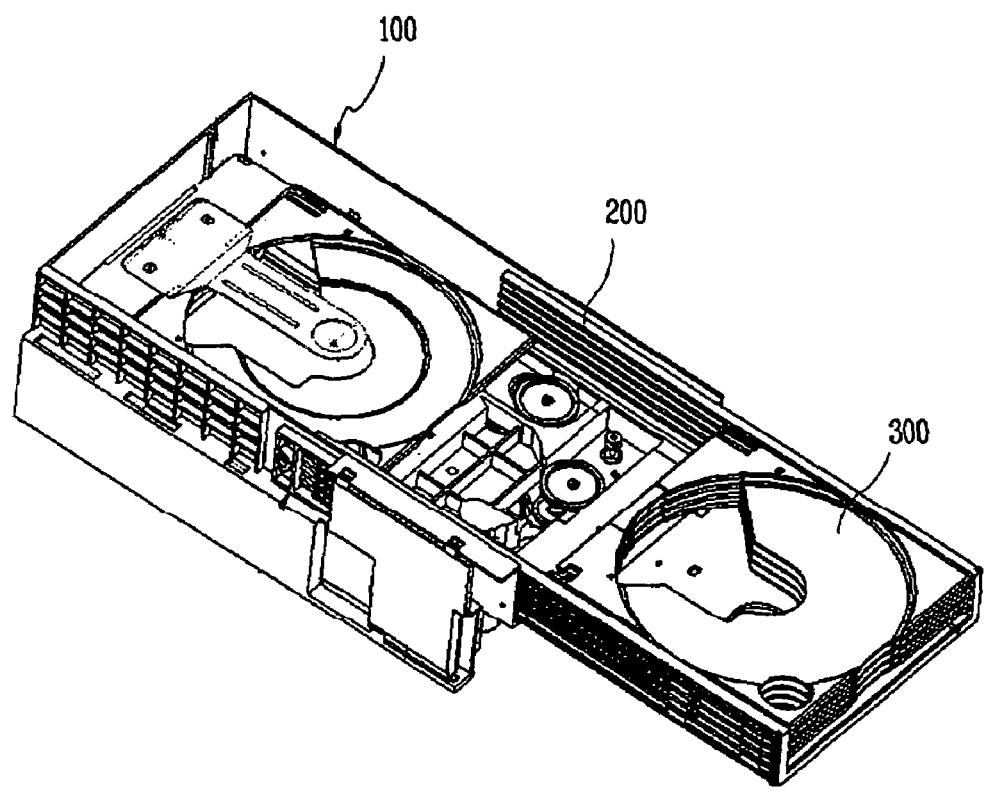
FIG. 23B is a perspective view showing the trays withdrawn in the mode of FIG. 23A.

As the first head 521 of a corresponding first lever 520 is released from the first groove 300a, the specific tray 300 is unlocked, and as shown in FIG. 23B, the specific tray 300 is drawn out of the main frame 100 together with the cartridge 200 by a cartridge driving unit (not shown).

At this time, other trays positioned at the lower side of the specific tray 300 are also drawn out of the main frame 100 together with the specific tray.

The operation of drawing all the trays out of the main frame so as for the user to check a disk of one tray or change an old disk to a new one will now be described with reference to FIGS. 23A and 23B.

Figure 22B:
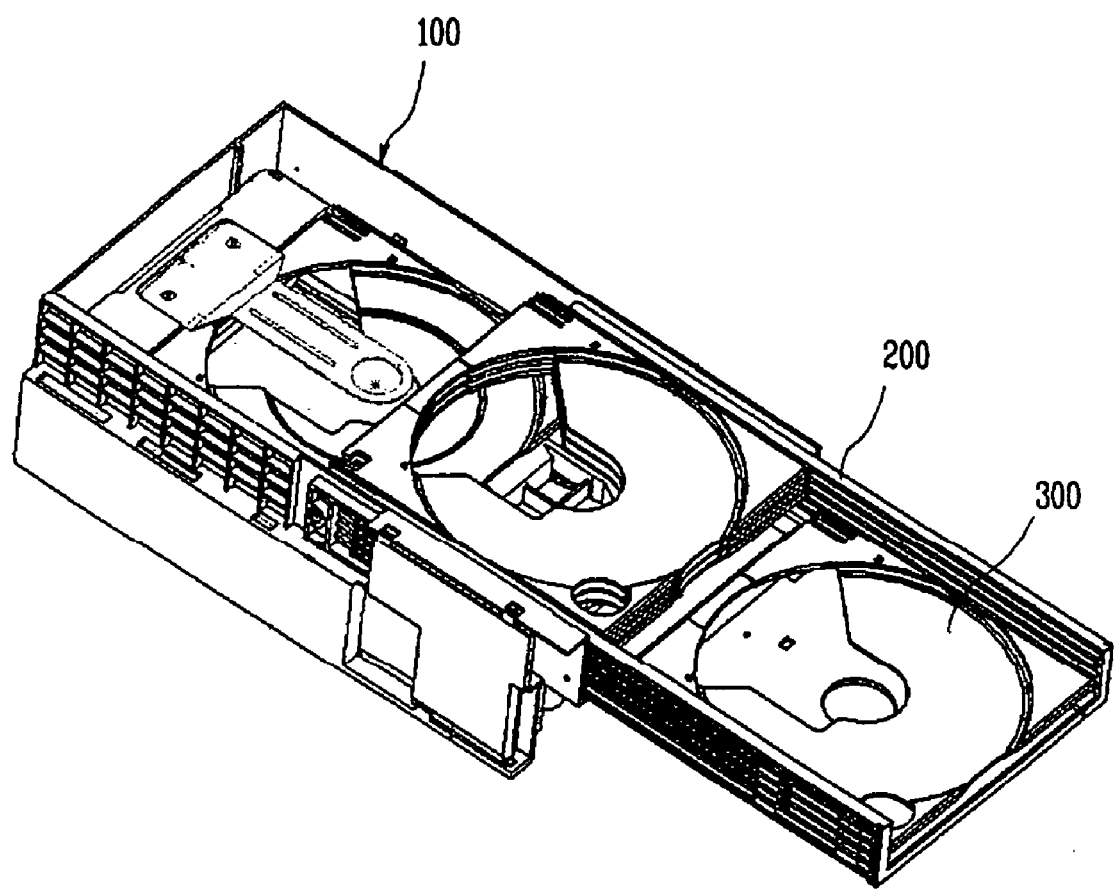
FIG. 22B is a perspective view showing a tray withdrawn in the mode of FIG. 22A.

The operation of withdrawing the entire trays is similar to the operation of withdrawing the specific tray as shown in FIGS. 22A and 22B.

Namely, as shown in FIG. 23A, when the moving plate 560 is moved to the end of the right side on the drawing, all the release protrusions 561 formed at the moving plate 560 push all the second protrusions 523 of each first lever 520 and each first protrusion 522 is maintained to be inserted in the locking groove 563.

At this time, each first lever 520 is rotated clockwise centering around the hinge part 510a, so each first head 521 is released from each first groove 300a.

The second lever 530 interworking with the first lever 520 is rotated counterclockwise centering around the hinge part 510b, so each second head 531 does not come in contact with the rail 221 of the cartridge 200.

In this state, as shown in FIG. 23B, the entire trays 300 are smoothly drawn out of the main frame 100 by means of the cartridge driving unit (not shown).

The operation of drawing each tray out of the main frame by stages so as for the user to check a disk of each tray or replace an old disk with a new one will now be described with reference to FIGS. 24A and 24B.

Figure 24A:
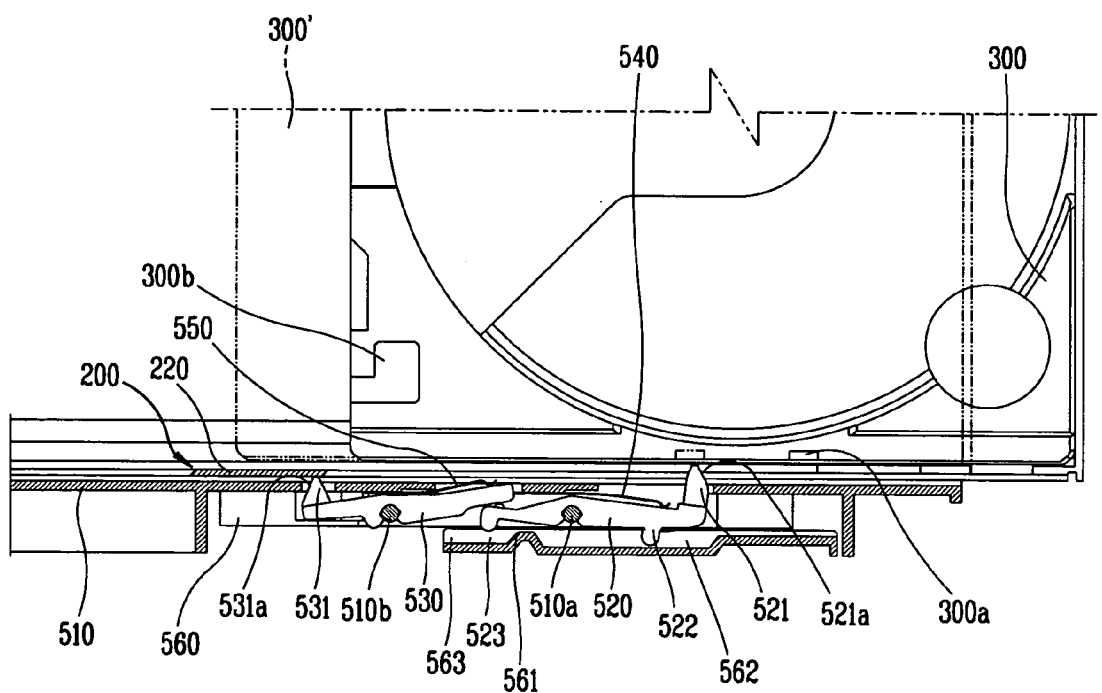
FIG. 24A is a plane and sectional view showing a mode for withdrawing each tray by stages during a process of withdrawing the cartridge.
Figure 24B:
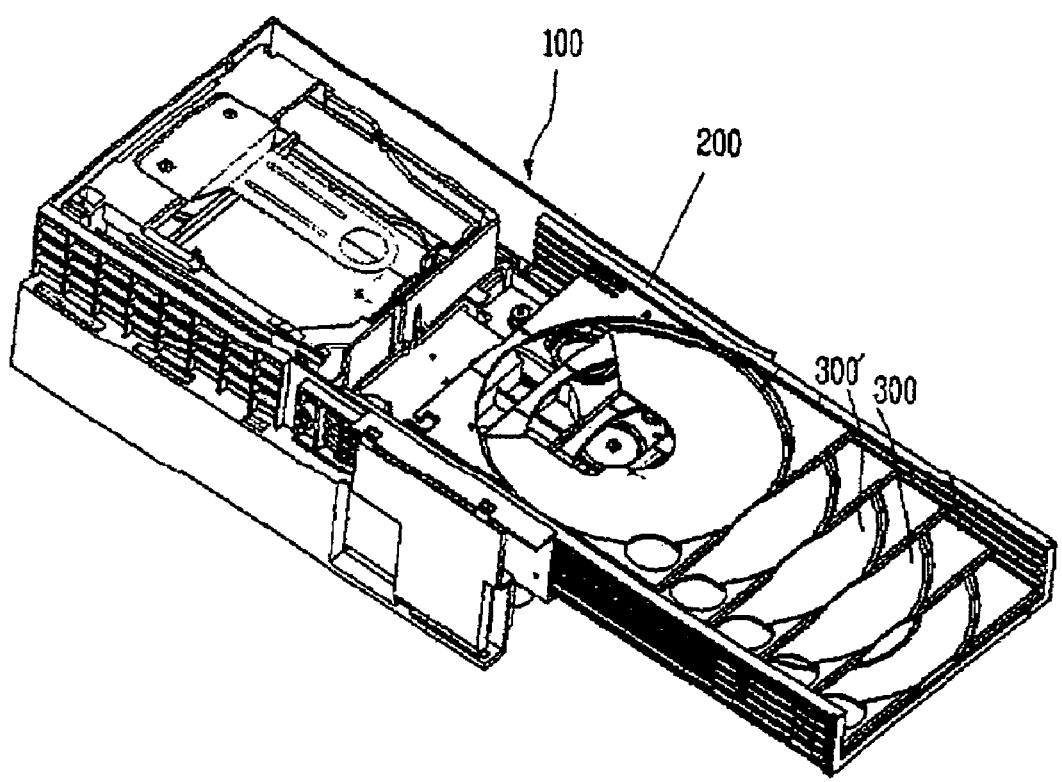
FIG. 24B is a perspective view showing the trays withdrawn in the mode of FIG. 24A.

As shown in FIG. 24A, each tray is withdrawn by each second lever 530, the first lever 520 interworking with each second lever 530 and each rail 220 of the cartridge 200 pressurized by the head 531 of each second lever 530.

In other words, when the cartridge 200 is drawn out of the main frame 100, the corresponding second lever 530, namely, the second lever 530 positioned at the second from the lowermost end of the fixed plate 510, presses the second-step rail 220 of the cartridge 200 (namely, the second rail from the lowermost end of the cartridge). At this time, thanks to the pressurization, the second lever 530 is rotated counterclockwise centering around the hinge 510b by overcoming an elastic force of the second plate spring 55. At the same time, the first lever 520 is also rotated clockwise centering around the hinge 510a owing to the elastic force of the first plate spring 540. Then, the first head 521 is released from the first groove 300a, the first lever 520 unlocks the tray 300, and the unlocked tray 300 is withdrawn together with the cartridge 300.

While the tray 300 is being withdrawn together with the cartridge 200, trays 300' (indicated in a virtual line) positioned at an above stage of the tray 300 are all locked. In this state, at the instant when the cartridge 200 is further withdrawn, the trays 300' positioned at the above stage of the tray 300 being withdrawn are sequentially withdrawn, whereby each tray is arranged by stages as shown in FIG. 24B.

For reference, the lowermost tray does not have a first groove, so it is not restricted by the tray selecting unit, and when the cartridge is drawn out of the main frame, the lowermost tray can be withdrawn together with the cartridge.

The operation of loading a specific tray in the disk drive in accordance with the present invention will now be described.

As shown in FIG. 8, each tray 300 is locked by each first lever 520. In this state, when the user selects a reproduction mode, the cam 710 is rotated as the second driving part 820 is driven as shown in FIG. 17.

Figure 14:
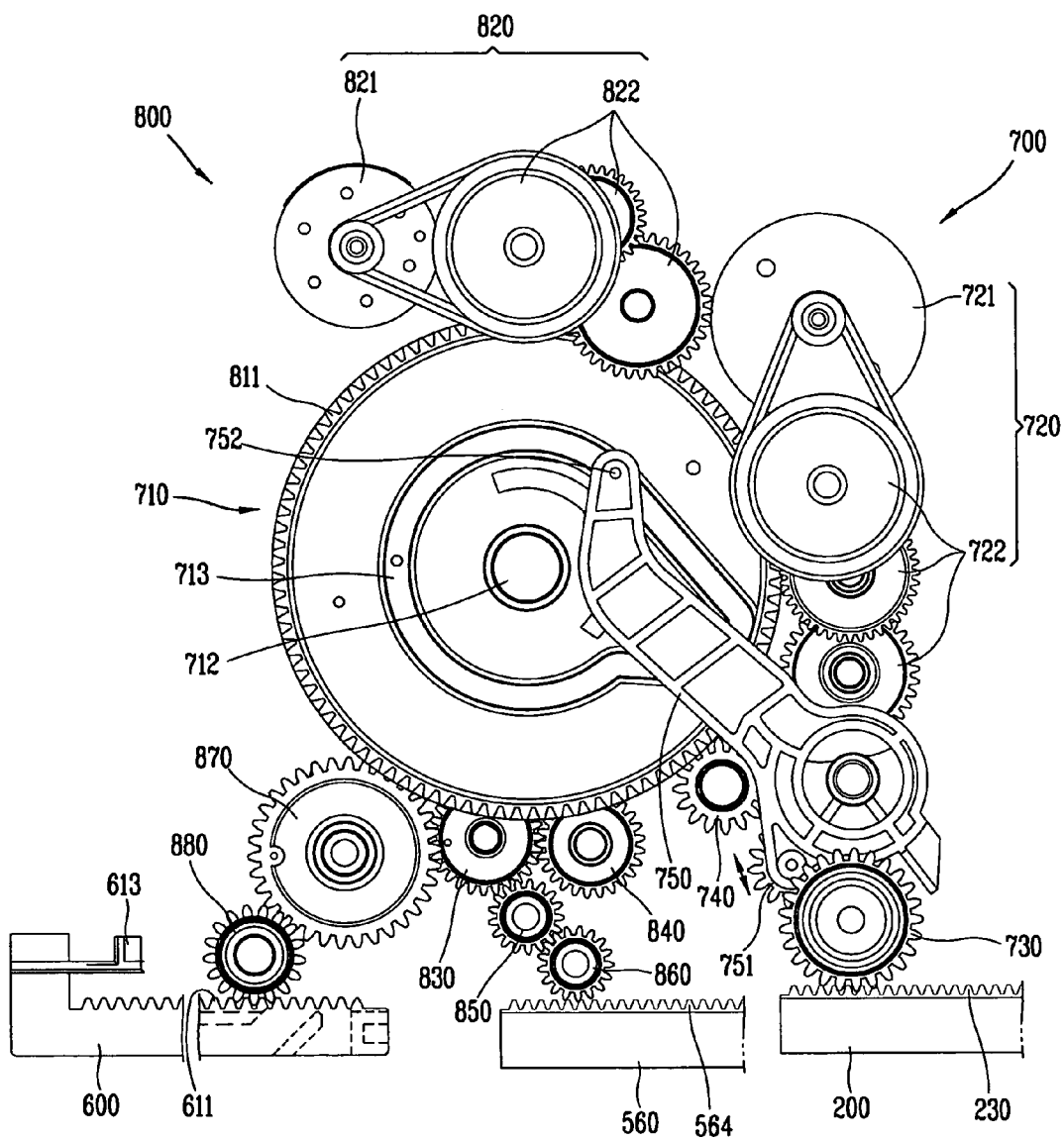
FIG. 14 is a plan view showing an overall driving unit of the disk drive in accordance with the present invention.

At the same time, as shown in FIG. 14, the idler gear 751 is rotated by the first driving part 720, and at this time, when the follower 752 of the first arm 750 is moved along the first path 713 of the cam 710, the idler gear 751 is moved in the arrow direction and engaged with the elevation pinion 740.

Accordingly, when the elevation pinion 740 in mesh with the idler gear 741 is rotated, the elevation unit 400 connected thereto is adjusted to a height corresponding to the loading frame 102, the elevation frame 101 and the first loading lever 610.

The loading hook 613 of the first loading lever 610 is maintained to be inserted in the second groove 300b of the specific tray 300 in order to load only the specific tray.

In this state, as the cam 710 is further rotated, the first select gear teeth 811 of the cam 710 rotates the first loading gear 870, and the first loading gear 870 rotates the loading pinion 880.

Since the loading pinion 880 is in mesh with the rack 611 of the first loading lever 610, the first loading lever 610 is slid toward the rear side of the main frame 100 to load the specific tray into the loading frame 102.

Right before the first loading lever 610 finishes its moving, the first slope protrusion 612 of the first loading lever 610 presses the second slope protrusion 622 of the second loading lever 620 to move a bit the second loading lever in the arrow direction.

Then, the rack 621 of the second loading lever 620 is engaged with the loading pinion 880, and the second loading lever 620 is further moved in the arrow direction by the driving of the loading pinion 880.

As the engaging protrusion 102a of the loading frame 102 ascends according to movement of the second loading lever 620 in the arrow direction, the loading frame 102 ascends centering around the hinge 103, and at this time, the turn table 104 ascends to mount the loaded disk.

The disk of the tray loaded at the turn table 105 is reproduced by an optical pick-up unit.

Reversely, the operation of unloading of the disk from the turn table 105 is performed in the opposite order, which is, thus, omitted.

The operation of driving the tray selecting unit 500 in the disk drive in accordance with the present invention will now be described.

As shown in FIG. 17, when the cam 710 is rotated according to driving of the second driving part 820, the first tray select gear 830 and the second tray select gear 840 respectively in mesh with the second select gear teeth 812 and the third select gear teeth 813 are rotated.

The second tray select gear 840 rotates the first tray select pinion 850, the tray select pinion 850 rotates the second tray select pinion 860, and the second tray select pinion 860 moves the moving plate 560 to a suitable position.

Figure 15:
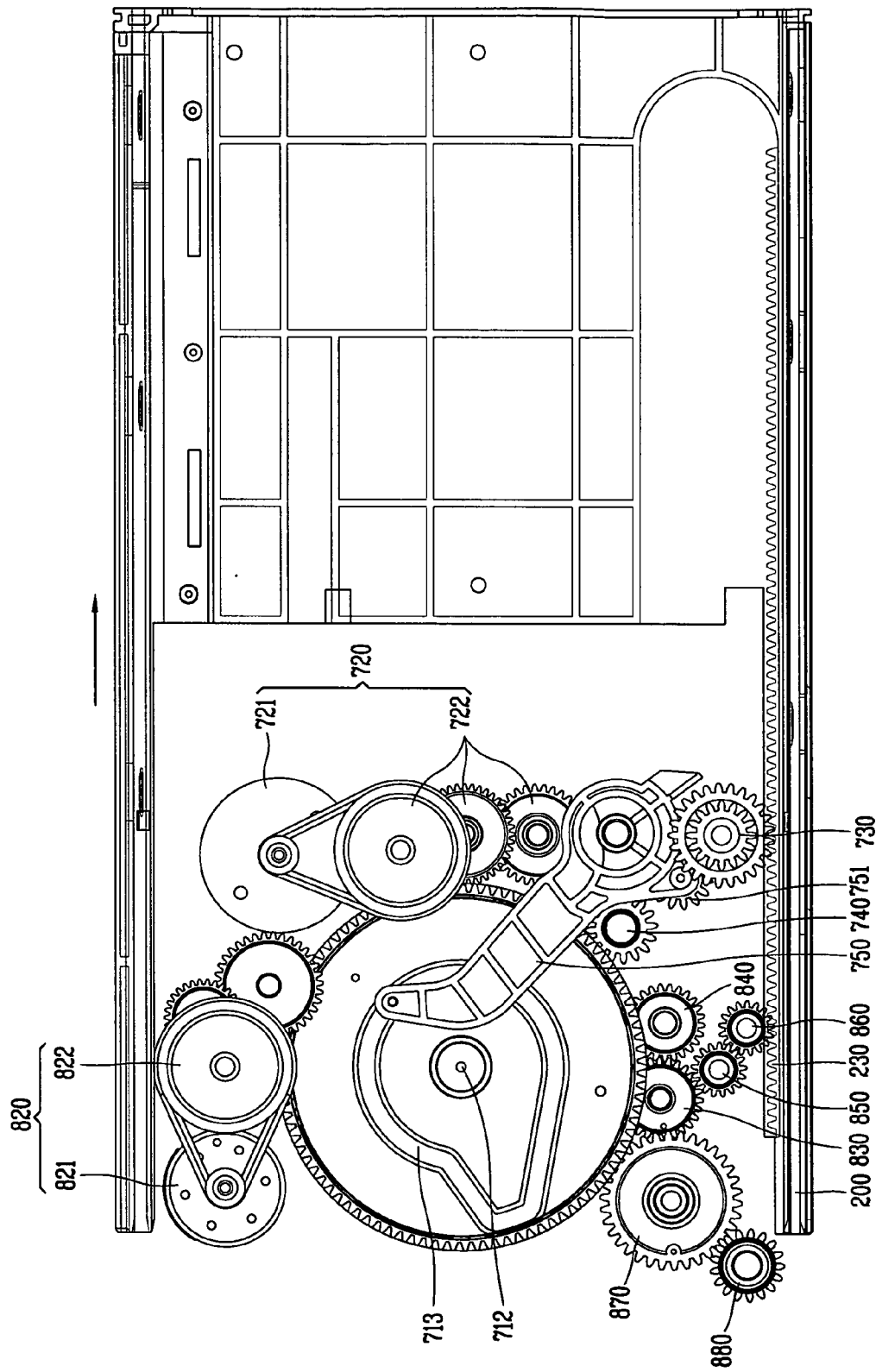
FIG. 15 is a plan view showing a state that an idler gear of a first arm is in mesh with a cartridge transfer gear of a first driving unit.
Figure 16:
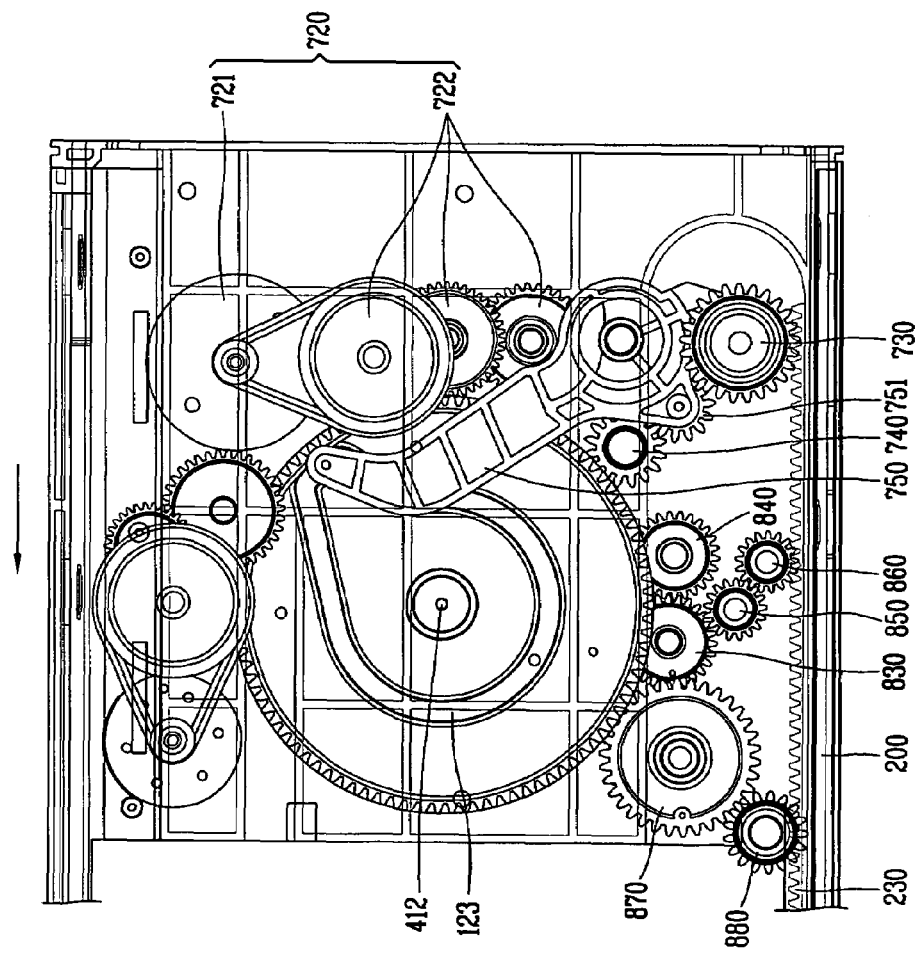
FIG. 16 is a plan view showing a state that an idler gear of a first arm is in mesh with an elevation gear of the first driving unit.

As the moving plate 860 is moved to the suitable position, movement of the first lever 520 and the second lever 530 is controlled. In this state, as shown in FIG. 15, as the follower 752 of the first arm 750 is moved along the first path 713 of the cam 710, the idler gear 751 is moved in the arrow direction to rotate the cartridge transfer pinion 730.

Then, since the cartridge transfer pinion 730 is in mesh with the rack 230 formed at a lower portion of the cartridge 200, when it is rotated, the cartridge 200 is drawn out of the main frame 100.

As so far described, the disk drive of the present invention has the following advantages.

That is, for example, more disks can be mounted in a relatively smaller overall size of the disk drive, and when the user draws the cartridge out of the main frame in order to check each tray or change an old disk to a new one, the user can draw a desired specific tray in a desired form.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A disk drive comprising:
  a main frame;
  a cartridge having rails at one side thereof, and slots at another side thereof, and slidably installed in the main frame;
  a plurality of disk trays stacked in the cartridge and slidably installed therein;
  an elevation unit for controlling a height of a turn table;
  a tray selecting unit for locking or unlocking each tray so that each tray can be loaded or unloaded to/from a loading platform;
  a loading unit for loading each tray above the turn table to reproduce/record data on a disk by an optical pick-up unit; and
  driving units for driving the cartridge, the elevation unit, the tray selecting unit and the loading unit,
  wherein the tray selecting unit comprises:
  a plate fixed at one side of the main frame and having a plurality of slots at a middle portion thereof;
  a first lever having a first head on one side thereof, a first protrusion and a second protrusion at the other side of both ends of the first lever, and rotatably installed at one side of each slot of the of the fixed plate to lock each tray;
  a second lever having a second head at one side thereof, and rotatably installed at the other side of each slot of the fixed plate to inter-work with the first lever;
  a first plate spring fixed at one inner side of the fixed plate and elastically supporting the first lever;
  a second plate spring fixed at the other inner side of the fixed plate and elastically supporting the second lever; and
  a moving plate having release protrusions for pressing the second protrusion of the first lever at one side thereof, a locking groove and a release groove at both sides of each release protrusion, and moveably installed at an outer side of the fixed plate.

2. The disk drive of claim 1, wherein an elevation frame is installed at one side of the main frame so as to ascend or descend, and a loading frame where the turn table is installed is installed at a lower side of the elevation frame so as to be rotated at a certain angle centering around a hinge.

3. The disk drive of claim 1, wherein tray rails are formed at both inner sides of the cartridge at equal intervals up and down to slide each tray.

4. The disk drive of claim 1, wherein the slot comprises:
  a horizontal slot into which the first head of the first lever is inserted; and
  a vertical slot into which a second head of the second lever is inserted.

5. The disk drive of claim 1, wherein the first plate spring supports the first lever in a direction that the first head of each first lever is released from the first groove of each tray, the second plate spring supports each first lever in a direction that the first head of each first lever is inserted into the first groove of each tray and also supports the second lever in a direction that the second head of each second lever is in contact with the rails, and the second plate spring has a greater elasticity coefficient than the first plate spring, so that positions of the first lever and the second lever are determined by the second plate spring.

6. The disk drive of claim 1, wherein the loading unit comprises:
   a first loading lever slidably installed at one side of an elevation frame in order to load the specific tray to the turn table of the loading frame; and
   a second loading lever slidably installed at the other side of the elevation frame in order to mount a disk of the specific tray on the turn table by means of the first loading lever.

7. The disk drive of claim 6, wherein racks are formed at an inner side of the first loading lever and have a first slope protrusion formed at one end and a loading hook formed at the other end and selectively inserted into the second groove formed at the tray,
   racks are formed at an inner side of the second loading lever, a second slope protrusion is formed at one end of the second loading lever so as to move horizontally the second loading lever by contacting with the first slope protrusion, and an ascending/descending groove is formed at the other side of the second loading lever, and
   a support protrusion is inserted into the ascending/descending groove so as to be moved along the ascending/descending groove.

8. The disk drive of claim 1, wherein the driving units comprise:
   a first driving unit for driving the cartridge and the elevation unit; and
   a second driving unit for driving the tray selecting unit and the disk loading unit.

9. The disk drive of claim 8, wherein the first driving unit comprises:
   a cam rotatably coupled by a shaft to the main frame and having a first arm path at a central portion of an upper surface thereof;
   a first driving part installed at the main frame and having a driving motor and a plurality of reduction gears;
   a cartridge transfer pinion for rotatably installed at the main frame so as to be engaged with a rack formed at a lower portion of the cartridge;
   an elevation pinion positioned between the cartridge transfer pinion and the cam, and rotatably installed at the main frame in order to transfer a driving force to the elevation unit;
   a first arm having a follower formed at one side thereof and inserted in a first path so as to be movable along the first path of the cam, and an idle gear installed at the other side and selectively transferring a driving force of the second driving unit to the cartridge transfer pinion or to the elevation pinion.

10. The disk drive of claim 8, wherein the second driving unit comprises:
    a cam having a first select gear teeth, a second select gear teeth and a third select gear teeth formed at its circumference;
    a second driving part installed at the main frame so as to rotate the cam and having a driving motor and a plurality of reduction gears in mesh with the cam;
    a first tray select gear rotatably installed at the main frame so as to be engaged with the first select gear teeth;
    a second tray select gear rotatably installed at the main frame so as to be engaged with the second select gear teeth;
    a first tray select pinion rotatably installed at the main frame so as to be engaged with the second tray select gear;
    a second tray select pinion rotatably installed at the main frame so as to connect the first tray select pinion and a rack formed at the lower portion of the moving plate of the tray select unit;
    a tray loading gear rotatably installed at the main frame so as to be engaged with the third select gear teeth; and
    a tray loading pinion rotatably installed at the main frame so as to connect the tray loading gear and a rack formed at the first loading lever of the loading unit.

11. The disk drive of claim 10, wherein the first select gear teeth, the second select gear teeth and the third select gear teeth are formed to be coaxial of the cam and sequentially stepped at certain intervals in an arc shape.

12. The disk drive of claim 10, wherein a second arm is installed between the tray loading gear and the first tray select gear to control rotation of the tray loading gear and the first tray select gear while moving along the second path formed at the a lower surface of the cam.

13. The disk drive of claim 12, wherein a follower is formed at one side of the second arm and moved along the second path formed at the lower surface of the cam and the other side of the second arm is hinged at the main frame, and a locking protrusion is formed at a middle portion of the second arm so as to be selectively inserted into the locking grooves respectively formed at the first tray select gear and the tray loading gear.

14. The disk drive of claim 1, wherein the slots of the fixed plate comprise a horizontal slot into which the first head of the first lever is inserted, and a vertical slot into which a second head of the second lever is inserted,
    the first plate spring supports the first lever in a direction that the first head of each first lever is released from the first groove of each tray,
    the second plate spring supports each first lever in a direction that the first head of each first lever is inserted into the first groove of each tray and also supports the second lever in a direction that the second head of each second lever is in contact with the rails, and
    the second plate spring has a greater elasticity coefficient than the first plate spring, so that positions of the first lever and the second lever are determined by the second plate spring.

15. A disk drive comprising:
    a main frame;
    a cartridge having rails at one side thereof, and slots at another, and slidably installed in the main frame;
    a plurality of disk trays stacked in the cartridge and slidably installed therein;
    an elevation unit for controlling a height of a turn table;
    a tray selecting unit for locking or unlocking each tray so that each tray can be loaded or unloaded to/from a loading position;
    a loading unit for loading each tray above the turntable to reproduce/record data on a disk by an optical pick-up unit; and
    driving units for driving the cartridge, the elevation unit, the tray selecting unit and the loading unit,
    wherein the tray selecting unit comprises:
    a fixed plated fixed at one side of the main frame and having a having a plurality of slots at a middle portion thereof;
    a first lever having a first head at one side thereof, a first protrusion and a second protrusion at the other side of both ends of the first lever, and rotatably installed at one side of each slot of the fixed plate to lock each tray;

a second lever having a second head at one side thereof, and rotably installed at the other side of each slot of the fixed plate to inter-work with the first lever;

a first plate spring fixed at one inner side of the fixed plate and elastically supporting the first lever;

a second plate spring fixed at the other inner side of the fixed plate and elastically supporting the second lever; and a moving plate having release protrusions for pressing the second protrusion of the first lever at one side thereof, a locking groove and a release groove at both sides of each release protrusion, and movably installed at an outer side of the fixed plate, wherein an elevation frame is installed at one side of the main frame, and a loading frame where the turn table is disposed is installed at a lower side of the elevation frame.

16. The disk drive of claim 15, wherein the loading unit comprises:

a first loading lever having racks at an inner side thereof, a first slope protrusion at one end thereof, and a loading hook at the other end thereof; and a second loading lever having racks at an inner side thereof, a second slope protrusion at one end thereof, and an ascending/descending groove at the other side thereof, wherein a support protrusion of the loading frame is inserted into ascending/descending groove so as to move along the ascending/descending groove.

* * * * *